United States Patent
Ichihara et al.

(10) Patent No.: US 10,949,318 B2
(45) Date of Patent: Mar. 16, 2021

(54) DISPLAY CONTROL APPARATUS, DISPLAY CONTROL METHOD, AND RECORDING MEDIUM ON WHICH DISPLAY CONTROL PROGRAM IS RECORDED

(71) Applicant: NEC Corporation, Tokyo (JP)

(72) Inventors: Etsuko Ichihara, Tokyo (JP); Koji Kida, Tokyo (JP); Yoshiaki Sakae, Tokyo (JP); Kazuhiko Isoyama, Tokyo (JP); Junpei Kamimura, Tokyo (JP); Takashi Nomura, Tokyo (JP); Yuji Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 16/061,403

(22) PCT Filed: Dec. 19, 2016

(86) PCT No.: PCT/JP2016/087705
§ 371 (c)(1),
(2) Date: Jun. 12, 2018

(87) PCT Pub. No.: WO2017/110706
PCT Pub. Date: Jun. 29, 2017

(65) Prior Publication Data
US 2020/0264962 A1 Aug. 20, 2020

(30) Foreign Application Priority Data
Dec. 21, 2015 (JP) .............................. JP2015-248443

(51) Int. Cl.
*G06F 11/32* (2006.01)
*G06F 11/30* (2006.01)
(Continued)

(52) U.S. Cl.
CPC ........ *G06F 11/324* (2013.01); *G06F 11/3013* (2013.01); *G06F 11/3051* (2013.01); *G06F 11/3419* (2013.01); *G06F 21/44* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,857,077 A | * | 1/1999 | Nakagaki | G06F 11/3476 709/206 |
| 2010/0214296 A1 | | 8/2010 | Kawamura | |
| 2012/0246478 A1 | | 9/2012 | Nakae et al. | |

FOREIGN PATENT DOCUMENTS

| | | |
|---|---|---|
| JP | H09-050410 A | 2/1997 |
| JP | 2003-131852 A | 5/2003 |

(Continued)

OTHER PUBLICATIONS

NirSoft, "USBDeview v2.75", Online, Searched on Dec. 1, 2015, URL: http://www.nirsoft.net/utils/usb_devices_view.html.

(Continued)

*Primary Examiner* — Travis R Hunnings

(57) ABSTRACT

Provided is, for example, a display control apparatus that generates display information with which an event having occurred in an information processing system can be easily determined. This display control apparatus 101 comprises a display control unit 102 that, on the basis of device information indicating a device detected by a first information processing apparatus in an information processing system and communication information indicating communication executed between a second information processing apparatus in the information processing system and a third information processing apparatus in the information processing system: performs displaying on a display apparatus in a manner such that said device and said first information (Continued)

processing apparatus are associated with one another; and performs displaying on said display apparatus in a manner such that said second information processing apparatus and said third information processing apparatus are associated with one another.

9 Claims, 28 Drawing Sheets

(51) Int. Cl.
*G06F 11/34* (2006.01)
*G06F 21/44* (2013.01)

(56) References Cited

FOREIGN PATENT DOCUMENTS

| JP | 2005-141467 A | 6/2005 |
| JP | 3158114 U | 3/2010 |
| JP | 2014-206887 A | 10/2014 |
| JP | 2014206887 A * | 10/2014 |
| WO | 2008/146639 A1 | 12/2008 |
| WO | 2008/146736 A1 | 12/2008 |

OTHER PUBLICATIONS

International Search Report for PCT Application No. PCT/JP2016/087705, dated Mar. 14, 2017.
English translation of Written opinion for PCT Application No. PCT/JP2016/087705.

* cited by examiner

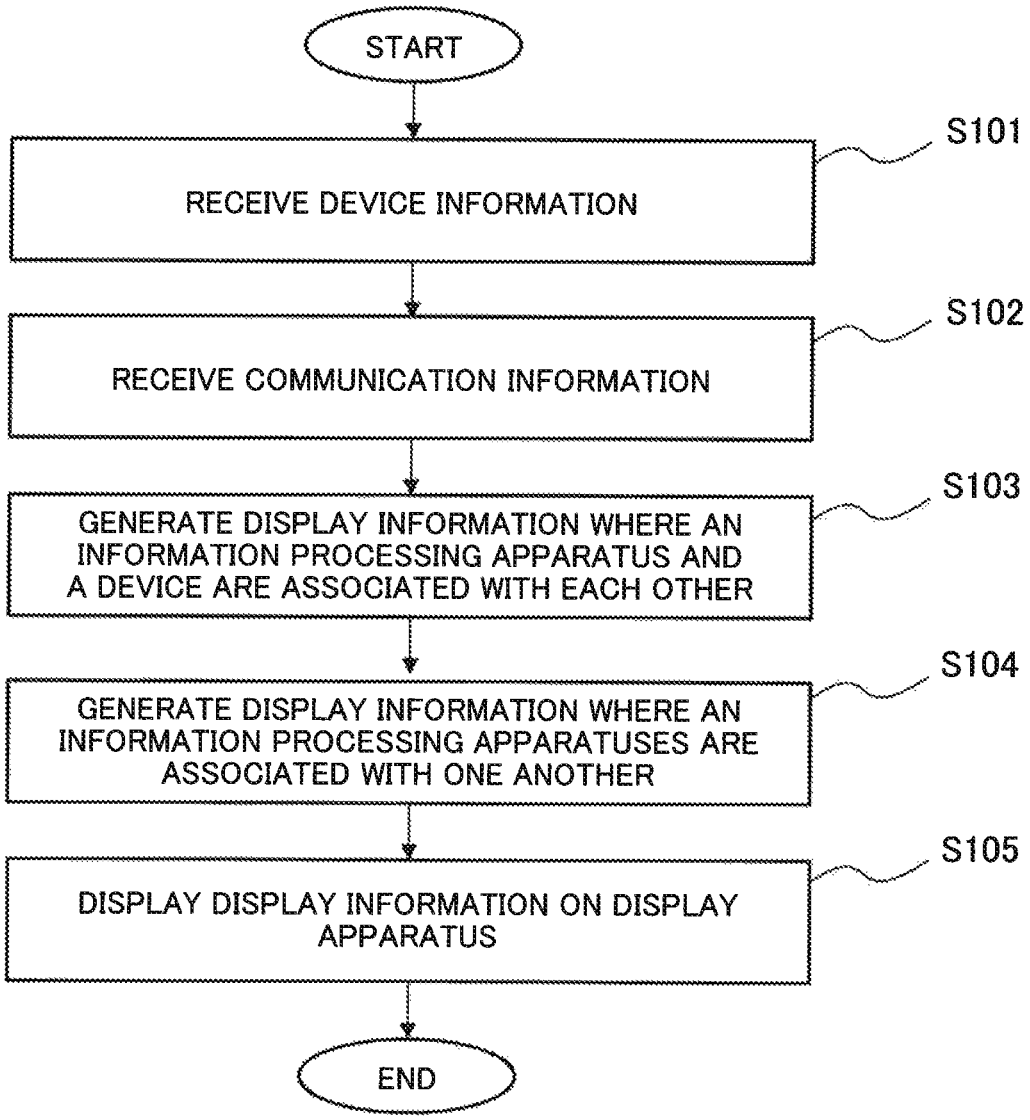

Fig.5

| SOURCE ID | DESTINATION ID |
|---|---|
| 000001 | 000003 |

Fig.6

| PROCESSING APPARATUS ID | LINK TARGET ID |
|---|---|
| 000001 | 000003 |
| 000001 | USB-003 |
| 000002 | USB-001 |
| 000002 | 000001 |
| 000003 | USB-002 |
| 000003 | 000001 |

Fig.10

| TIMING | PROCESSING APPARATUS ID | LINK TARGET ID | CONTENT INFORMATION |
|---|---|---|---|
| 2015/5/12 12:01:00 | 000001 | USB-001 | Open E:¥home¥example.exe |

Fig. 11

LINK INFORMATION STORAGE UNIT 203

| TIMING | PROCESSING APPARATUS ID | LINK TARGET ID | CONTENT INFORMATION |
|---|---|---|---|
| 2015/5/12 12:00:00 | 000001 | 000002 | Send C:¥home¥text.txt |
| 2015/5/12 12:01:00 | 000001 | USB-001 | Open E:¥home¥example.exe |
| 2015/5/12 12:02:00 | 000002 | USB-002 | Open E:¥home¥movie.mp4 |
| 2015/5/12 12:03:00 | 000001 | USB-002 | Open E:¥home¥picture.png |

Fig.15

| TIMING | PROCESSING APPARATUS ID | LINK TARGET ID | CONTENT INFORMATION | TYPE | AUTHORIZATION STATE |
|---|---|---|---|---|---|
| 2015/5/12 12:00:00 | 000001 | USB-001 | Open E:¥home¥example.txt | DEVICE | AUTHORIZED |

Fig.16

INSPECTION INFORMATION STORAGE UNIT

| TIMING | PROCESSING APPARATUS ID | LINK TARGET ID | CONTENT INFORMATION | TYPE | AUTHORIZATION STATE |
|---|---|---|---|---|---|
| 2015/5/12 12:00:00 | 000001 | USB-001 | Open E:¥home¥example.exe | DEVICE | AUTHORIZED |
| 2015/5/12 12:01:00 | 000001 | USB-001 | Open E:¥home¥virus.exe | DEVICE | AUTHORIZED |
| 2015/5/12 12:02:00 | 000001 | USB-003 | Open E:¥home¥picture.png | DEVICE | AUTHORIZED |
| 2015/5/12 12:03:00 | 000001 | USB-003 | Open E:¥home¥hoge.png | DEVICE | AUTHORIZED |

| PROCESSING APPARATUS ID | LINK TARGET ID | CONTENT INFORMATION | TYPE | AUTHORIZATION STATE | LINK STATE | CONTENT STATE |
|---|---|---|---|---|---|---|
| 000001 | 000002 | Send C:¥home¥text.txt | DEVICE | AUTHORIZED | NEW | NEW |
| 000001 | USB-001 | Open E:¥home¥example.exe | DEVICE | AUTHORIZED | NEW | REGISTERED |
| 000002 | USB-003 | Open E:¥home¥movie.mp4 | DEVICE | AUTHORIZED | REGISTERED | NEW |
| 000001 | USB-003 | Open E:¥home¥picture.png | DEVICE | AUTHORIZED | REGISTERED | REGISTERED |

Fig.20

| PROCESSING APPARATUS ID | LINK TARGET ID | CONTENT INFORMATION |
|---|---|---|
| 000001 | USB-001 | Open E:¥home¥virus.exe |

Fig.21

| PROCESSING APPARATUS ID | LINK TARGET ID | CONTENT INFORMATION |
|---|---|---|
| 000001 | USB-003 | Open E:¥home¥picture.png |

Fig.22

| PROCESSING APPARATUS ID | LINK TARGET ID | CONTENT INFORMATION |
|---|---|---|
| 000001 | USB-003 | Open E:¥home¥hoge.png |

Fig.23

| AUTHORIZATION STATE | CONTENT STATE | TIMING | PROCESSING APPARATUS ID | LINK TARGET ID | CONTENT INFORMATION |
|---|---|---|---|---|---|
| Y | ABNORMAL | 2015/5/12 12:00:00 | 000001 | USB-001 | Open E:\home\virus.exe |
| N | NORMAL | 2015/5/12 12:01:00 | 000002 | USB-010 | Open E:\home\example.exe |
| Y | NORMAL | 2015/5/12 12:02:00 | 000001 | USB-002 | Open E:\home\picture.png |
| N | ABNORMAL | 2015/5/12 12:03:00 | 000003 | USB-020 | Open E:\home\anomaly.exe |
| - | NORMAL | 2015/5/12 12:04:00 | 000003 | 000002 | Send C:\home\result.txt |
| - | ABNORMAL | 2015/5/12 12:05:00 | 000004 | 000003 | Send C:\home\anomaly.exe |

Y : AUTHORIZED DEVICE
N : UNAUTHORIZED DEVICE

Fig.24

| PROCESSING APPARATUS ID \ LINK TARGET ID | 000001 | 000002 | 000003 | 000004 | 000005 | USB-001 | USB-002 | USB-003 | USB-010 | ... |
|---|---|---|---|---|---|---|---|---|---|---|
| 000001 |  | C |  |  |  |  |  | C | B |  |
| 000002 | A |  |  |  |  | A |  | C | B |  |
| 000003 | A | C |  |  |  | A |  | A |  |  |
| 000004 | C |  |  |  |  |  |  | A | D |  |
| 000005 | A |  |  |  |  |  |  | A | D |  |
| ... |  |  |  |  |  |  |  |  |  |  |

A : LINK TARGET IS NOT NEW, AND CONTENT INFORMATION IS NOT NEW
B : LINK TARGET IS NEW, AND CONTENT INFORMATION IS NOT NEW
C : LINK TARGET IS NOT NEW, AND CONTENT INFORMATION IS NEW
D : LINK TARGET IS NEW, AND CONTENT INFORMATION IS NEW

DISPLAY CONTROL APPARATUS, DISPLAY CONTROL METHOD, AND RECORDING MEDIUM ON WHICH DISPLAY CONTROL PROGRAM IS RECORDED

This application is a National Stage Entry of PCT/JP2016/087705 filed on Dec. 19, 2016, which claims priority from Japanese Patent Application 2015-248443 filed on Dec. 21, 2015, the contents of all of which are incorporated herein by reference, in their entirety.

TECHNICAL FIELD

The present invention relates to a display control apparatus generating display information by which a user is able to visually determine an input/output executed on an information processing system.

BACKGROUND ART

When an information processing system is monitored, an event occurring in the information processing system may be visualized, or an abnormal event out of events occurring in the information processing system may be detected. PTL 1 discloses a server firmly securing security of an information processing system. PTL 2 or PTL 3 discloses an apparatus capable of analyzing an event occurring in an information processing system. PTL 4, PTL 5, or NPL 1 discloses an apparatus capable of visualizing an event occurring in an information processing system. In the following description, the apparatus (or the system) disclosed in PTLs 1 to 5 or NPL 1 will be described.

The project management server disclosed in PTL 1 authorizes users related to virtual machines arranged in a plurality of computers (information processing apparatuses), respectively. When authorizing a user, the project management server transmits an encryption key unique to a project to which the user belongs, to a computer for which the user is authorized. The user executes an operation related to the project on the computer and generates operation data being an execution result of the operation. When operation data are generated, the computer encrypts the operation data by use of the encryption key unique to the project, the key being transmitted by the project management server, and transmits the encrypted operation data to the project management server.

An insertable storage device disclosed in PTL 2 stores a scanning program detecting a computer virus. An information processing apparatus connected to the storage device scans a storage area capable of storing data stored in the storage device in accordance with the scanning program stored in the storage device. When the information processing apparatus detects a computer virus, the storage device reports detection of the computer virus through a reporting apparatus installed in the storage device.

A monitoring apparatus disclosed in PTL 3 extracts a message being a replacement candidate from messages received from an information processing system being a monitoring target. The monitoring apparatus replaces the extracted message being a replacement candidate, in accordance with a predetermined rule. When a storage unit storing a message to be displayed by a display apparatus does not store a replaced message, the observation apparatus stores the message into the storage unit.

A data display apparatus disclosed in PTL 4 displays a plurality of pieces of time-series data related to a semiconductor process, the data being associated with a time axis. When data in a partial range out of the displayed time-series data are specified, the data display apparatus displays an enlarged view of the specified data in the partial range on the display apparatus.

In response to receiving a serviceman call, an image formation apparatus disclosed in PTL 5 synthesizes a display image indicating operation history information associated with the serviceman call.

NPL 1 discloses software managing a device connected to a universal serial bus (USB) port of an information processing apparatus connected to a communication network. The software displays information about a device connected to a USB port included in the information processing apparatus for each device. For example, the software is able to display only an authorized device or only an unauthorized device.

The software allows a user to observe whether or not an information processing apparatus is infected with a computer virus, by monitoring a device connected to a USB port of the information processing apparatus. For example, when an unauthorized device is connected to a USB port, a user is able to prevent an information processing apparatus from being infected with a computer virus by disabling the USB port. Alternatively, when an unauthorized device is connected to a USB port of an information processing apparatus, a user is able to prevent the information processing system from being infected with a computer virus by isolating the information processing apparatus from a communication network.

CITATION LIST

Patent Literature

PTL 1: International Publication No. WO2008/146639
PTL 2: Registered utility model No. 3158114
PTL 3: Japanese Unexamined Patent Application Publication No. 2005-141467
PTL 4: International Publication No. WO2008/146736
PTL 5: Japanese Unexamined Patent Application Publication No. 2003-131852

Non-Patent Literature

NPL 1: NirSoft "USBDeview", [online], December 2015, [Searched at Dec. 1, 2015], Internet <URL: http://www.nirsoft.net/utils/usb_devices_view.html>

SUMMARY OF INVENTION

Technical Problem

However, even when a user observes an event occurring in an information processing system on the basis of information displayed by the apparatus disclosed in PTL 4, PTL 5, or NPL 1, the user cannot always recognize the event occurring in the information processing system easily. The reason is that, even when the apparatus displays an event receiving attention such as a device and time-series data, the displayed information is merely part of the event occurring in the information processing system.

Accordingly, an object of the present invention is to provide a display control apparatus and the like generating display information for specifying an event occurring in an information processing system easily.

Advantageous Effects of Invention

Solution to Problem

As an aspect of the present invention, a display control apparatus including:
display control means for displaying a device and a first information processing apparatus on a display apparatus in accordance with a mode of associating the device with the first information processing apparatus and displaying a second information processing apparatus and a third information processing apparatus in accordance with a mode of associating the second information processing apparatus with the third information processing apparatus, based on device information indicating the device detected in the first information processing apparatus in an information processing system and communication information indicating a communication between the second information processing apparatus in the information processing system and the third information processing apparatus in the information processing system.

In addition, as another aspect of the present invention, a display control method including:
displaying a device and a first information processing apparatus on a display apparatus in accordance with a mode of associating the device with the first information processing apparatus and displaying a second information processing apparatus and a third information processing apparatus in accordance with a mode of associating the second information processing apparatus with the third information processing apparatus, based on device information indicating the device detected in the first information processing apparatus in an information processing system and communication information indicating a communication between the second information processing apparatus in the information processing system and the third information processing apparatus in the information processing system.

In addition, as another aspect of the present invention, a display control program including:
a display control function for displaying a device and a first information processing apparatus on a display apparatus in accordance with a mode of associating the device with the first information processing apparatus and displaying a second information processing apparatus and a third information processing apparatus in accordance with a mode of associating the second information processing apparatus with the third information processing apparatus, based on device information indicating the device detected in the first information processing apparatus in an information processing system and communication information indicating a communication between the second information processing apparatus in the information processing system and the third information processing apparatus in the information processing system.

Furthermore, the object is also realized by a computer-readable recording medium that records the program.

Advantageous Effects of Invention

A display control apparatus and the like according to the present invention are able to generate display information for specifying an event occurring in an information processing system easily.

BRIEF DESCRIPTION OF DRAWINGS

FIG. 3 is a flowchart illustrating a processing flow in the display control apparatus according to the first example embodiment.

FIG. 4 is a diagram conceptually illustrating an example of device information.

FIG. 5 is a diagram conceptually illustrating an example of communication information.

FIG. 6 is a diagram conceptually illustrating an example of display information generated by the display control apparatus according to the first example embodiment.

FIG. 10 is a diagram conceptually illustrating an example of link information.

FIG. 11 is a diagram conceptually illustrating an example of link information stored (to be stored) in a link information storage unit.

FIG. 15 is a diagram conceptually illustrating an example of inspection information.

FIG. 16 is a diagram conceptually illustrating an example of inspection information stored in an inspection information storage unit.

FIG. 19 is a diagram conceptually illustrating an example of inspection information.

FIG. 20 is a diagram conceptually illustrating an example of link information.

FIG. 21 is a diagram conceptually illustrating an example of link information.

FIG. 22 is a diagram conceptually illustrating an example of link information.

FIG. 23 is a diagrams illustrating examples of display information.

FIG. 24 is a diagrams illustrating examples of display information.

DESCRIPTION OF EMBODIMENTS

Next, example embodiments of the present invention will be described in detail with reference to drawings.

First Example Embodiment

Figure 1:
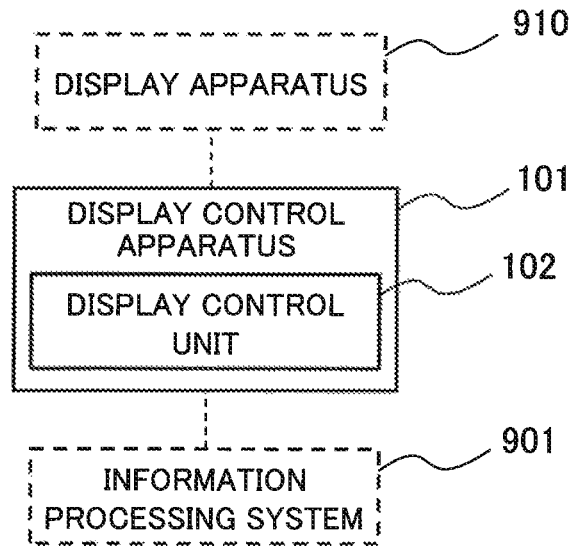
FIG. 1 is a block diagram illustrating a configuration of a display control apparatus according to a first example embodiment of the present invention.

A configuration of a display control apparatus 101 according to a first example embodiment of the present invention will be described in detail with reference to FIG. 1. FIG. 1 is a block diagram illustrating a configuration of the display control apparatus 101 according to the first example embodiment of the present invention.

The display control apparatus 101 according to the first example embodiment includes a display control unit (display controller) 102. The display control apparatus 101 can display generated display information on a display apparatus 910.

The display control apparatus 101 receives device information (to be described later with reference to FIG. 4) detected in an information processing apparatus in an information processing system 901 (to be described later with reference to FIG. 2) and communication information (to be described later with reference to FIG. 5) indicating a communication executed in the information processing system 901.

Figure 2:
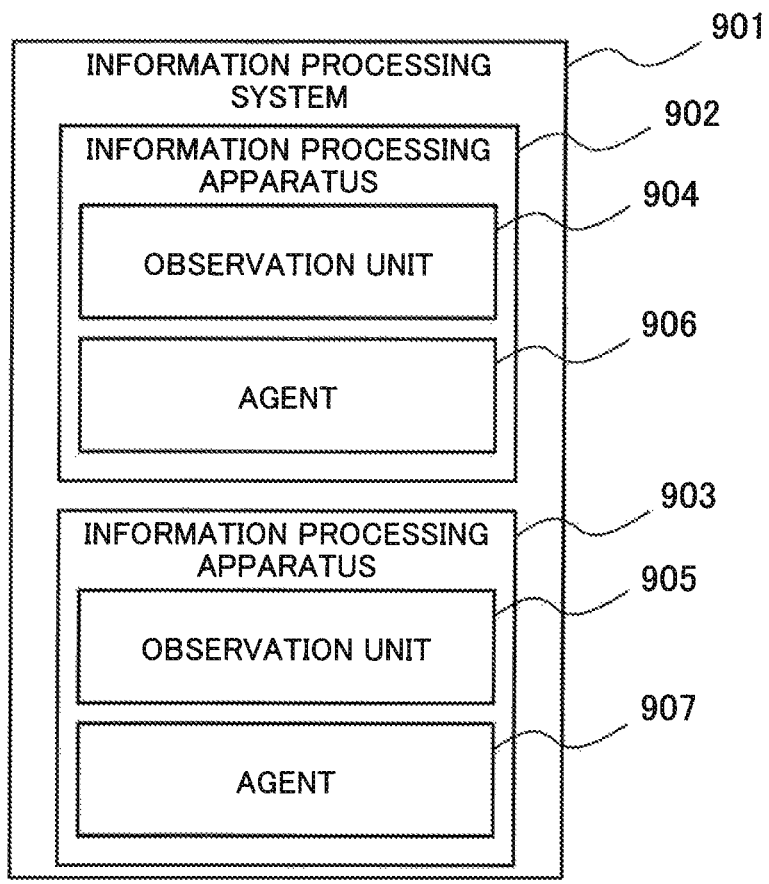
FIG. 2 is a block diagram illustrating a configuration of an information processing system.

After the information processing system 901, the device information, and the communication information will be described in detail with reference to FIGS. 2, 4, and 5, processing in the display control apparatus 101 according to the first example embodiment will be described in detail with reference to FIG. 3.

A configuration of the information processing system 901 exemplified in FIG. 2 will be described in detail. FIG. 2 is a block diagram illustrating a configuration of the information processing system 901.

The information processing system 901 includes a plurality of information processing apparatuses (e.g. an information processing apparatus 902 and an information processing apparatus 903). The information processing apparatus 902 includes an observation unit (observer) 904 observing a device or the like linked to the information processing apparatus 902 and an agent 906 transmitting information generated by the observation unit (observer) 904 to the display control apparatus 101. Similarly, the information processing apparatus 903 includes an observation unit (observer) 905 observing a device or the like linked to the information processing apparatus 903 and an agent 907 transmitting information generated by the observation unit 905 to the display control apparatus 101. The number of information processing apparatuses in the information processing system 901 does not necessarily need to be two and may have only to be more than one. In other words, the information processing system 901 is not limited to the example illustrated in FIG. 2.

In each example embodiment of the present invention, "linked" refers to a state in which data (or information) are exchangeable and does not necessarily refer to a state of being physically in contact. In other words, a "linked" state may be a state in which data are exchangeable through a wired line or a state in which data are exchangeable through a wireless line.

Next, device information will be described with reference to FIG. 4. FIG. 4 is a diagram conceptually illustrating an example of device information. The device information is information where a processing apparatus identifier (identifier hereinafter being abbreviated to "ID") identifying an information processing apparatus and a device ID identifying a device (e.g. a recording medium including a USB memory, a CD-R, or a DVD) linked to the information processing apparatus are associated with each other.

DVD is an abbreviation of Digital Versatile Disc. CD-R is an abbreviation of Compact Disk-Recordable. USB is an abbreviation of Universal Serial Bus.

For convenience of description, an information processing apparatus is represented by an information processing apparatus 902, an observation unit is represented by an observation unit 904, and an agent is represented by an agent 906 in the following description. However, an information processing apparatus has only to be in the information processing system 901 and may be a different information processing apparatus such as an information processing apparatus 903. In other words, the information processing apparatus is not limited to the information processing apparatus 902.

For example, in the device information exemplified in FIG. 4, a processing apparatus ID "000002" and a device ID "USB-001" are associated with each other. This indicates that a device identified by the device ID "USB-001" is linked to an information processing apparatus (assumed to be the "information processing apparatus 902") identified by the processing apparatus ID "000002." When detecting a device linked to an information processing apparatus, the observation unit 904 in the information processing apparatus 902 generates device information where a processing apparatus ID identifying the information processing apparatus 902 and a device ID identifying the detected device are associated with each other.

The device information may include a plurality of device IDs.

The device information may not necessarily include a processing apparatus ID. The reason is that a device observed by an observation unit 904 in an information processing apparatus 902 is a device linked to the information processing apparatus 902, and, therefore, the display control apparatus 101 can identify a processing apparatus ID of the information processing apparatus 902 by specifying an information processing apparatus 902 transmitting the device information. Device information generated by the observation unit 904 may not necessarily include a processing apparatus ID identifying the information processing apparatus 902. The device information may further include at least one type of information out of information indicating processing executed between the device and the information processing apparatus 902, and information indicating input/output data. The device information is not limited to the above-described example.

Next, communication information will be described with reference to FIG. 5. FIG. 5 is a diagram conceptually illustrating an example of communication information. The communication information is information where a processing apparatus ID of an information processing apparatus to be a source (for convenience of description, hereinafter referred to as a "source ID") transmitting information in a communication, the communication being executed in the information processing system 901, and a processing apparatus ID of an information processing apparatus to be a destination (for convenience of description, hereinafter referred to as a "destination ID") receiving information in the communication are associated with one another.

In the communication information exemplified in FIG. 5, a source ID "000001" and a destination ID "000003" are associated with each other. This indicates that an information processing apparatus identified by the source ID "000001" executes a communication of transmitting data to an information processing apparatus identified by the destination ID "000003," in the information processing system 901.

For example, the communication information is generated by an agent 906 in an information processing apparatus 902. The agent 906 detects a communication executed by the information processing apparatus 902 and identifies a processing apparatus ID of a source transmitting data and a processing apparatus ID of a destination receiving the data with respect to the detected communication. The agent 906 generates communication information (FIG. 5) where a processing apparatus ID of the source (i.e. a "source ID") and a processing apparatus ID of the destination (i.e. a "destination ID") are associated with each other.

The communication information may not necessarily be associated with a processing apparatus ID of a source. The reason is that a communication observed by an agent 906 is a communication executed by an information processing apparatus 902 including the agent 906. Therefore, communication information generated by the agent 906 may not necessarily include a processing apparatus ID of the information processing apparatus 902. In this case, the display control apparatus 101 specifies an information processing apparatus 902 transmitting the communication information and, thereby, can specify the processing apparatus ID (i.e. the source ID). The communication information may further include information indicating processing executed between the source and the destination, or information indicating transmitted and received data. The communication information is not limited to the above-described example.

For convenience of description, it is assumed that device information is information where a processing apparatus ID and a device ID of a device linked to an information processing apparatus identified by the processing apparatus ID are associated with each other in the present example embodiment. It is assumed that communication information is information where a source ID and a destination ID are associated with each other.

Next, the display control apparatus 101 according to the first example embodiment will be described with reference to FIG. 3. FIG. 3 is a flowchart illustrating a processing flow in the display control apparatus 101 according to the first example embodiment.

The display control apparatus 101 receives device information (exemplified in FIG. 4) transmitted by an agent 906 in an information processing apparatus 902 (Step S101). The display control apparatus 101 receives communication information (exemplified in FIG. 5) transmitted by the agent 906 in the information processing apparatus 902 (Step S102). The display control apparatus 101 may receive device information after receiving communication information.

The display control unit 102 generates display information where a device ID and a processing apparatus ID in the received device information (exemplified in FIG. 4) are associated with one another (Step S103). Additionally, the display control unit 102 generates display information where the display information is associated with a source ID and a destination ID in the received communication information (Step S104). The display control unit 102 displays the display information generated in Step S103 and the display information generated in Step S104 on the display apparatus 910 (Step S105). Specifically, the display control unit 102 displays two display information, that is display information where the device ID and the processing apparatus ID are associated with each other and display information (to be described later with reference to FIG. 6) where the source ID and the destination ID are associated with each other, on the display apparatus 910. In other words, the display control unit 102 shows two display information, that is display information where a device identified by the device ID and an information processing apparatus identified by the processing apparatus ID are associated with each other and display information where an information processing apparatus represented by the source ID and an information processing apparatus identified by the destination ID are associated with each other, on the display apparatus 910.

Display information generated by the display control apparatus 101 will be described with reference to FIG. 6. FIG. 6 is a diagram conceptually illustrating an example of display information generated by the display control apparatus 101 according to the first example embodiment. In the display information, a processing apparatus ID of an information processing apparatus and a link target ID of a link target (an information processing apparatus or a device) related to processing executed at the information processing apparatus are associated with each other. For example, a link target of processing related to an information processing apparatus is an information processing apparatus being a communication counterpart in a communication executed by the information processing apparatus. Alternatively, a link target of processing related to an information processing apparatus represents a device linked to the information processing apparatus. In other words, the display information associates two processing apparatus IDs of individual information processing apparatus executing a communication in the information processing system 901 with one another. The display information also associates a processing apparatus ID of an information processing apparatus with a device ID of a device linked to the information processing apparatus.

For example, in the display information exemplified in FIG. 6, a processing apparatus ID "000001" and a link target ID "000003" are associated with each other. This indicates a communication executed between an information processing apparatus identified by the processing apparatus ID "000001" and a link target (an information processing apparatus in this case) identified by the link target ID "000003." For example, in the display information exemplified in FIG. 6, the processing apparatus ID "000001" and a link target ID "USB-003" are associated with each other. This indicates processing executed between the information processing apparatus identified by the processing apparatus ID "000001" and a link target (a device in this case) identified by the link target ID "USB-003." In other words, the display information includes, with respect to the information processing apparatus identified by the processing apparatus ID "000001", information indicating a communication counterpart (information processing apparatus) with which a communication is executed and information indicating a device linked to the information processing apparatus. Similarly, with respect to an information processing apparatus identified by a processing apparatus ID "000002," the display information includes information indicating a communication counterpart with which a communication is executed and information indicating a device linked to the information processing apparatus. The display information is not limited to the example illustrated in FIG. 6.

The display control unit 102 may execute the processing indicated in Step S103 after executing the processing indicated in Step S104.

Next, an advantageous effect of the display control apparatus 101 according to the first example embodiment will be described.

The display control apparatus 101 according to the present example embodiment can generate display information for specifying an event occurring in an information processing system 901 easily. The reason is that the display control apparatus 101 according to the first example embodiment displays not only information about a communication executed in the information processing system 901 but also information about a device linked to an information processing apparatus in the information processing system 901 on the display apparatus 910. The reason will be described in more detail.

When inputting data from outside, an information processing apparatus executes at least either type of processing of receiving the data through a communication network and inputting the data through a device linked to the information processing apparatus. The information processing apparatus is attacked from outside through the communication network or through the device linked to the information processing apparatus.

The display control apparatus 101 according to the present example embodiment shows two display information, that is information where a plurality of information processing apparatuses are associated with one another and display information where an information processing apparatus and a device linked to the information processing apparatus are associated with each other, on the display apparatus 910 and, thereby shows processing executed through the above-described two paths. In other words, the display control apparatus 101 displays the two types of display information on the display apparatus 910, as information indicating the processing (or the communication) executed through the two paths. As a result, a user can comprehensively understand processing executed between each information processing apparatus and the outside on the basis of display information generated by the display control apparatus 101 according to the present example embodiment, By contrast, the apparatus disclosed in PTL 4, PTL 5, or NPL 1 displays only an event (e.g. a communication network) receiving attention with respect to an information processing apparatus. Accordingly, in case of the apparatuses, a user must refer to every piece of information individually displayed by each apparatus with respect to the information processing system in order to monitor processing executed in the information processing system. In other words, the apparatus disclosed in PTL 4, PTL 5, or NPL 1 cannot realize easy understanding of processing executed between individual information processing apparatus and the outside.

Second Example Embodiment

Next, a second example embodiment of the present invention based on the above-described first example embodiment will be described.

In the following description, a part characteristic of the present example embodiment is mainly described, and a same reference numeral is given to a similar configuration described in the above-described first example embodiment, thus omitting redundant description thereof.

Figure 7:
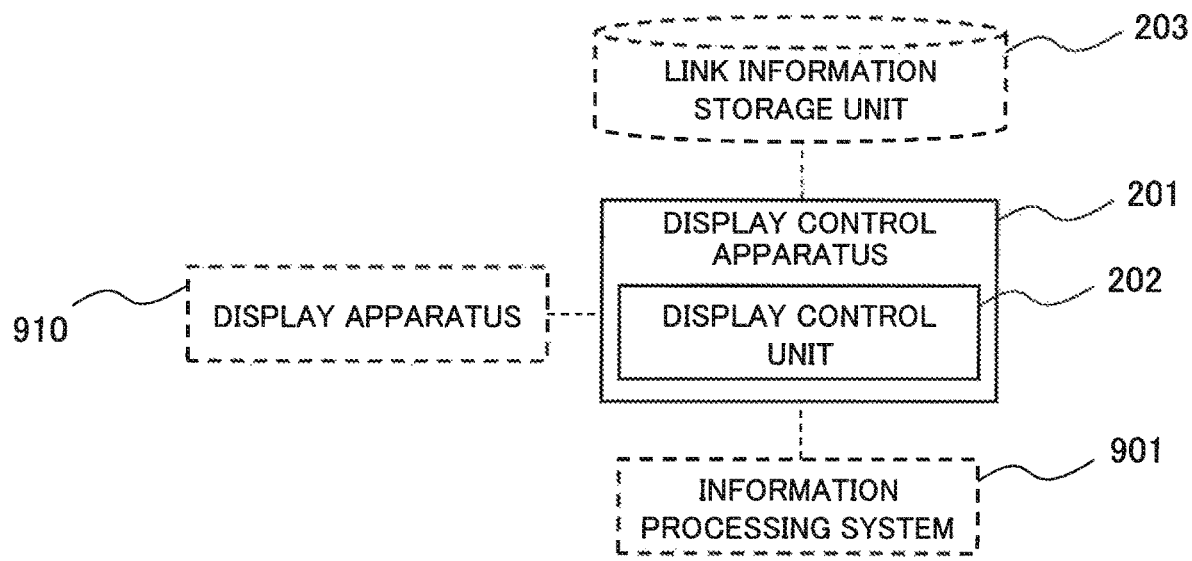
FIG. 7 is a block diagram illustrating a configuration of a display control apparatus according to a second example embodiment of the present invention.

A configuration of a display control apparatus 201 according to the second example embodiment of the present invention will be described in detail with reference to FIG. 7. FIG. 7 is a block diagram illustrating a configuration of the display control apparatus 201 according to the second example embodiment of the present invention.

The display control apparatus 201 according to the second example embodiment includes a display control unit (display controller) 202. The display control apparatus 201 can generate, refer to, or update link information stored (to be stored) in a link information storage unit 203 (to be described later with reference to FIG. 11). The display control apparatus 201 can display generated display information on a display apparatus 910.

The display control apparatus 201 receives device information (exemplified in FIG. 4) indicating a device detected in an information processing apparatus in an information processing system 901 (exemplified in FIG. 2) and communication information (exemplified in FIG. 5) indicating a communication executed in the information processing system 901. For example, the device information and the communication information are transmitted by an agent in individual information processing apparatus in the information processing system 901.

After link information will be described with reference to FIGS. 10 and 11, processing in the information processing system 901 (exemplified in FIG. 2) will be described with reference to examples. Subsequently, processing in the display control apparatus 201 according to the second example embodiment will be described with reference to FIGS. 8 and 9.

First, link information will be described with reference to FIGS. 10 and 11. FIG. 10 is a diagram conceptually illustrating an example of link information. FIG. 11 is a diagram conceptually illustrating an example of link information stored (to be stored) in the link information storage unit 203.

In link information, a processing apparatus ID identifying an information processing apparatus in the information processing system 901, a link target ID of a link target linked to the information processing apparatus, content information indicating a processing content executed between the link target and the information processing apparatus, and a timing (a date and time) at which the processing is executed are associated with one another. The content information includes information indicating processing and information indicating data input and output of the processing.

The link target indicates an information processing apparatus in the information processing system 901 or a device linked to an information processing apparatus. The link target ID indicates a processing apparatus ID of individual information processing apparatus in the information processing system 901 or a device ID of a device linked to an information processing apparatus.

In the link information exemplified in FIG. 10, a timing "2015/5/12_12:01:00," a processing apparatus ID "000001," a link target ID "USB-001," and content information "Open_E:¥home¥example.exe" are associated with one another. Symbol "¥" (backslash) denotes a directory separator. This indicates that an information processing apparatus identified by the processing apparatus ID "000001" is linked to a link target (an information processing apparatus or a device) identified by the link target ID "USB-001" at the timing "2015/5/12_12:01:00," and processing content executed through the link is "Open_E:¥home¥example.exe." For example, in the link information exemplified in FIG. 11, a timing "2015/5/12_12:00:00," a processing apparatus ID "000001," a link target ID "000002," and content information "Send_C:¥home¥text.txt" are associated with one another. This indicates that an information processing apparatus identified by the processing apparatus ID "00001" is linked to a link target (an information processing apparatus or a device) identified by the link target ID "000002" at the timing "2015/5/12_12:00:00," and content information about processing executed through the link is "Send_C:¥home¥text.txt.".

Link information may not necessarily include the above-described items. In other words, the link information is not limited to the above-described example.

Next, processing in the information processing system 901 (exemplified in FIG. 2) will be described in detail with reference to examples.

An observation unit 904 observes a physical device (e.g. a USB memory or a CD-R, hereinafter simply referred to as a "device") linked to an information processing apparatus 902 including the observation unit 904. For example, the observation unit 904 generates device information. The device information represents that the device is linked to (or inserted to or removed from) the information processing apparatus 902. Additionally, the device information includes content information indicating input-output processing executed through the device. The observation unit 904 outputs the generated device information to an agent 906 in the information processing apparatus 902.

For example, the observation unit 904 generates device information where first to third items (fields) are associated with one another. The items include:
   First item: a timing at which the observation unit 904 outputs the device information,
   Second item: a device ID for uniquely identifying a device, and
   Third item: content information about input-output processing executed between an information processing apparatus 902 and a device.
The device information may further include another item such as a processing apparatus ID of an information processing apparatus 902. The device information is not limited to the above-described example.

For example, the observation unit 904 generates device information where values of respective items exemplified below are associated with one another, with respect to the first to third items. The items include:
   Example of the first item: a timing "2015/5/12_12:00:00",
   Example of the second item: a device ID "USB-001," and
   Example of the third item: content information "Open_E:¥home¥example.exe."
The device information indicates that a device identified by the device ID "USB-001" is linked to the information processing apparatus at the timing "2015/5/12_12:00:00," and processing of opening a file (Open) "E:¥home¥example.exe" is executed by the device.

For example, the observation unit 904 may be provided by use of a function of observing a device ID or a function of observing a file (e.g. Event_Tracing_for_Windows [ETW]), the functions being included in an operating system such as Windows (registered trademark).

The agent 906 inputs device information output by the observation unit 904. The agent 906 further observes a communication executed at an information processing apparatus 902 including the agent 906 and generates communication information indicating the observation result. In other words, for example, with respect to a communication executed at the information processing apparatus 902, the agent 906 generates communication information indicating a processing content of the communication. The agent 906 observes the information processing apparatus 902 including the agent 906, and generates, for example, communication information where the following fourth to seventh items are associated with one another. The items include:
   Fourth item: a timing at which the agent 906 generates the communication information,
   Fifth item: a processing apparatus ID (i.e. a source ID such as a MAC address, an IP address, or a domain name) of an information processing apparatus 902 including the agent 906,
   Sixth item: a processing apparatus ID (i.e. a destination ID) of a destination (information processing apparatus) from which the information processing apparatus 902 receives information, and
   Seventh item: content information indicating a content communicated between the information processing apparatus 902 and the destination.
MAC is an abbreviation of Media Access Control. IP is an abbreviation of Internet Protocol. The communication information may include another item and is not limited to the above-described example.

For example, the agent 906 generates communication information where values of respective items exemplified below are associated with one another, with respect to the fourth to seventh items. The items include:
   Example of the fourth item: a timing "2015/5/12_12:00:00,"
   Example of the fifth item: a processing apparatus ID "000001,"
   Example of the sixth item: a processing apparatus ID "000002" representing an information processing apparatus to be a destination, and
   Example of the seventh item: content information "Send_E:¥home¥example.exe."
The communication information indicates that an information processing apparatus identified by the processing apparatus ID "000001" has executed a communication of transmitting (Send) the data "E:¥home¥example.exe" to an information processing apparatus identified by the processing apparatus ID "000002" at the timing "2015/5/12_12:00:00."

The agent 906 transmits generated communication information or input device information to the display control apparatus 201.

Figure 8:
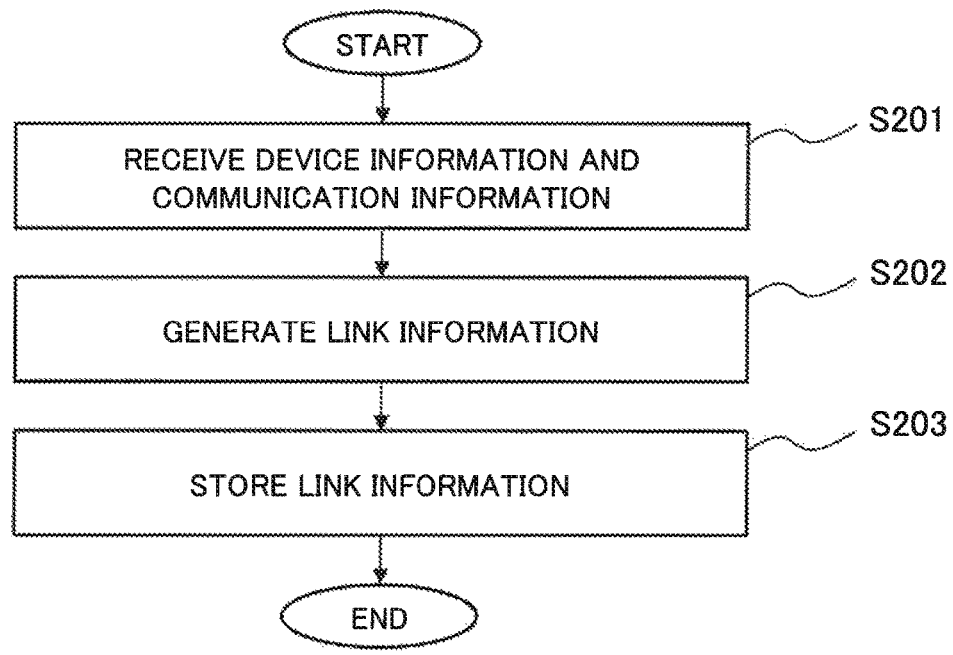
FIG. 8 is a flowchart illustrating a flow of processing in the display control apparatus according to the second example embodiment when receiving device information or communication information.
Figure 9:
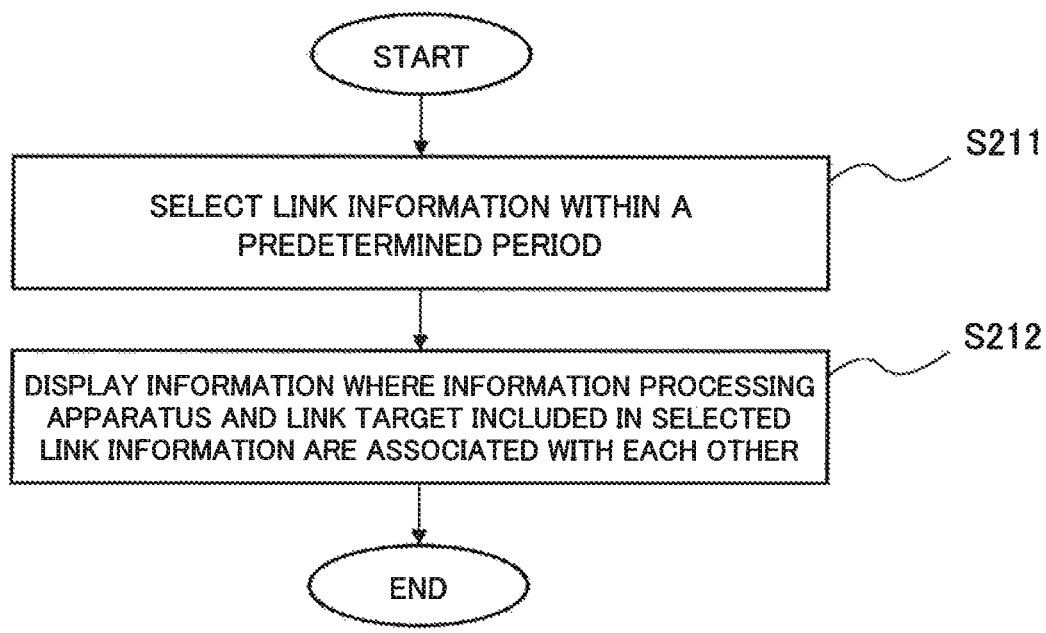
FIG. 9 is a flowchart illustrating a flow of processing in the display control apparatus according to the second example embodiment when displaying display information on a display apparatus.

Next, processing in the display control apparatus 201 according to the second example embodiment will be described with reference to FIGS. 8 and 9. FIG. 8 is a flowchart illustrating a flow of processing in the display control apparatus 201 according to the second example embodiment when receiving device information or communication information. FIG. 9 is a flowchart illustrating a flow of processing in the display control apparatus 201 according to the second example embodiment when displaying display information on the display apparatus 910.

First, processing in the display control apparatus 201 when receiving device information will be described with reference to FIG. 8.

The display control apparatus 201 receives device information transmitted from an agent 906 in an information processing apparatus 902 (in the information processing system 901) (Step S201).

When receiving the device information (first to third items) transmitted by the agent 906 from the information processing apparatus 902, the display control unit 202 generates link information (exemplified in FIG. 10) where respective values related to the first to third items included in the received device information and a processing apparatus ID of the information processing apparatus 902 are associated with each other (Step S202).

In the link information exemplified in FIG. 10, a timing, a processing apparatus ID of an information processing apparatus, a link target ID of a link target (an information processing apparatus or a device) linked to the information processing apparatus, and content information indicating processing executed between the link target and the information processing apparatus are associated with one another.

When receiving the device information where the above-described examples of the first to third items are associated with one another (Step S201), the display control unit 202 generates link information where the respective values related to the first to third items and a processing apparatus ID "000001" of the information processing apparatus transmitting the device information are associated with each other (Step S202).

The display control unit 202 stores the generated link information into the link information storage unit 203 (Step S203).

Next, processing in the display control apparatus 201 when receiving communication information will be described with reference to FIG. 8.

The display control apparatus 201 receives communication information (fourth to seventh items) transmitted by an agent 906 in an information processing apparatus 902 (in the information processing system 901) (Step S201).

When receiving the communication information (fourth to seventh items) transmitted by the agent 906 from the information processing apparatus 902, the display control unit 202 generates link information including respective values related to the fourth to seventh items included in the received communication information (Step S202). For example, when receiving communication information where the above-described examples of the fourth to seventh items are associated with one another, the display control unit 202 generates link information where the respective values related to the fourth to seventh items are associated with one another. The display control unit 202 stores the generated link information into the link information storage unit 203 (Step S203).

Device information and communication information transmitted by the agent 906 are not limited to the above-described examples. For example, communication information transmitted by the agent 906 may not include a processing apparatus ID (i.e. a value related to the fifth item). When receiving communication information where respective values of the fourth, sixth, and seventh items are associated with one another, the display control apparatus 201 generates link information where a processing apparatus ID of an information processing apparatus 902 transmitting the communication information and the respective values in the received communication information are associated with each other.

Next, processing in the display control apparatus 201 according to the second example embodiment when displaying display information on the display apparatus 910 will be described with reference to FIG. 9.

The display control unit 202 selects link information, a timing in the link information being within a predetermined period, from link information (exemplified in FIG. 11) stored in the link information storage unit 203 (Step S211). For example, the predetermined period is a period from "a timing preceding a timing of executing Step S211 by a predetermined time" to "the timing of executing Step S211." In this case, the display control unit 202 selects link information associated with a timing preceding the timing of executing Step S211 by the predetermined time or less.

Next, the display control unit 202 generates display information where a processing apparatus ID included in the selected link information and a link target ID are associate with each other and displays the generated display information on the display apparatus 910 (Step S212). In other words, the display control unit 202 generates display information associating an information processing apparatus identified by the processing apparatus ID included in the selected information with a device identified by the link target ID. The display information also associates information processing apparatuses identified by a plurality of processing apparatus IDs in the selected information with one another. The display control unit 202 displays the generated display information on the display apparatus 910.

The display control apparatus 201 may further include a timeout unit (not depicted) calculating a predetermined period.

For example, it is assumed that the timeout unit includes information about a timing (e.g. a date and time, or a time) in the information processing system 901. For example, the timeout unit may acquire information about a timing from an apparatus such as a time server including the information about the timing. The timeout unit subtracts a predetermined time (e.g. one minute) from a timing (e.g. a current timing) of executing Step S211 and transmits the calculated value to the display control unit 202. The display control unit 202 selects link information including a timing at or after the value transmitted by the timeout unit.

Next, an advantageous effect of the display control apparatus 201 according to the second example embodiment will be described.

The display control apparatus 201 according to the present example embodiment is able to generate display information for specifying an event occurring in the information processing system 901 easily. The reason is similar to the reason described in the first example embodiment.

Furthermore, the display control apparatus 201 according to the present example embodiment can generate display information indicating an event occurring in the information processing system 901 in real time. The reason is that the display control apparatus 201 displays link information at or after a timing obtained by subtracting a predetermined time from a timing of executing the processing indicated in Step S211 (FIG. 9).

Third Example Embodiment

Next, a third example embodiment of the present invention based on the above-described first example embodiment will be described.

In the following description, a part characteristic of the present example embodiment is mainly described, and a same reference numeral is given to a similar configuration described in the above-described first example embodiment, thus omitting redundant description thereof.

Figure 12:
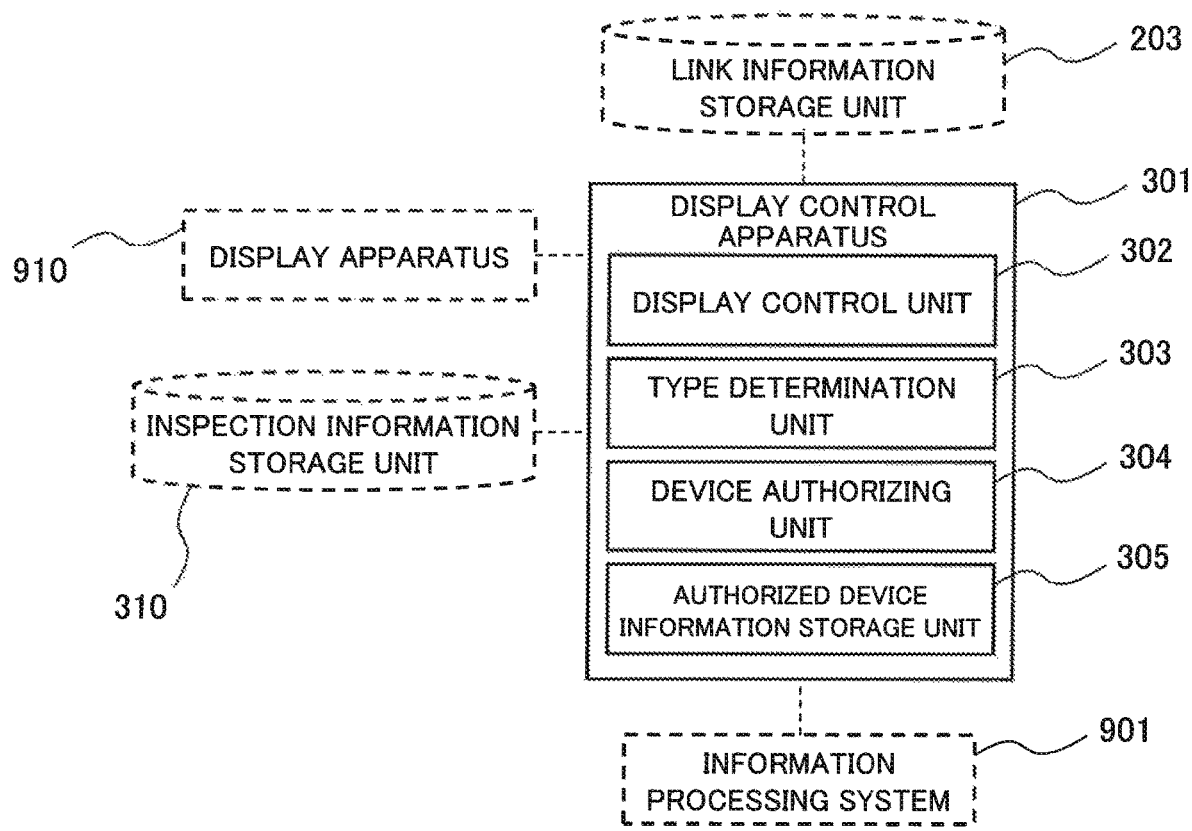
FIG. 12 is a block diagram illustrating a configuration of a display control apparatus according to a third example embodiment of the present invention.

A configuration of a display control apparatus 301 according to the third example embodiment of the present invention will be described in detail with reference to FIG. 12. FIG. 12 is a block diagram illustrating a configuration of the display control apparatus 301 according to the third example embodiment of the present invention.

The display control apparatus 301 according to the third example embodiment includes a display control unit (display controller) 302, a type determination unit (type determiner) 303, a device authorizing unit (device authorizer) 304, and an authorized device information storage unit 305. The display control apparatus 301 can display generated display information on a display apparatus 910.

The display control apparatus 301 can generate, refer to, or update link information (exemplified in FIG. 11) stored (to be stored) in a link information storage unit 203. The display control apparatus 301 can refer to authorized device information (to be described later with reference to FIG. 14) stored in the authorized device information storage unit 305. The display control apparatus 301 can generate, refer to, or update inspection information stored (to be stored) in an inspection information storage unit 310 (to be described later with reference to FIG. 16). The display control apparatus 301 receives device information (exemplified in FIG. 4) detected in an information processing apparatus in an information processing system 901 (exemplified in FIG. 2) and communication information (exemplified in FIG. 5) indicating a communication executed in the information processing system 901. For example, the device information and the communication information are transmitted by an agent in individual information processing apparatus in the information processing system 901.

Figure 14:
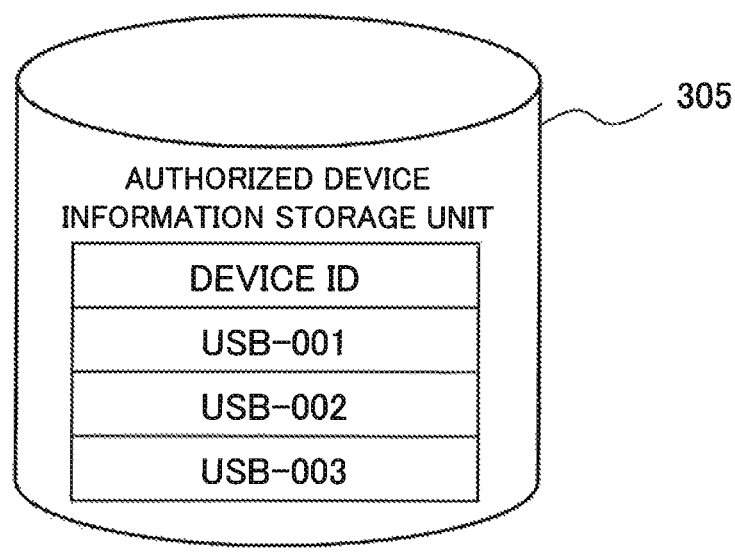
FIG. 14 is a diagram conceptually illustrating an example of authorized device information.

First, authorized device information stored in the authorized device information storage unit 305 will be described with reference to FIG. 14. FIG. 14 is a diagram conceptually illustrating an example of authorized device information. As exemplified in FIG. 14, the authorized device information storage unit 305 stores authorized device information including a device ID of a device being authorized (an "authorized device").

The authorized device information storage unit 305 stores authorized device information including a device ID of an authorized device. For example, when a device ID is composed of six numbers, authorized device information includes a device ID composed of six numbers representing an authorized device. For example, authorized device information exemplified in FIG. 16 includes a device ID "USB-001," a device ID "USB-002," and a device ID "USB-003."

This indicates that each of a device identified by the device ID "USB-001," a device identified by the device ID "USB-002," and a device identified by the device ID "USB-003" is an authorized device. A device not being an authorized device is hereinafter also referred to as an "unauthorized device."

Next, inspection information will be described with reference to FIGS. 15 and 16. FIG. 15 is a diagram conceptually illustrating an example of inspection information. FIG. 16 is a diagram conceptually illustrating an example of inspection information stored in the inspection information storage unit 310.

In inspection information, a processing apparatus ID of an information processing apparatus, a link target ID of a link target (an information processing apparatus or a device), content information indicating processing executed when the information processing apparatus is linked to the link target, and a timing when the processing is executed are associated with one another. In the inspection information, a "type" (to be described later with reference to FIG. 13) indicating whether the link target ID is a device ID or a processing apparatus ID, and an "authorization state" indicating whether or not a link target identified by the link target ID is an authorized device are further associated with this information.

Referring to the inspection information exemplified in FIG. 16, a timing "2015/5/12_12:02:00," a processing apparatus ID "000001," a link target ID "USB-003," content information "Open_E:¥home¥picture.png," a type "device," and an authorization state "authorized" are associated with one another. This indicates that an information processing apparatus identified by the processing apparatus ID "000001" and a link target (an information processing apparatus or a device) identified by the link target ID "USB-003" execute the processing "Open_E:¥home¥picture.png" at the timing "2015/5/12_12:02:00." This further indicates that a type of the link target identified by the link target ID "USB-003" is a device, and the link target identified by the link target ID "USB-003" is an authorized device.

Figure 13:
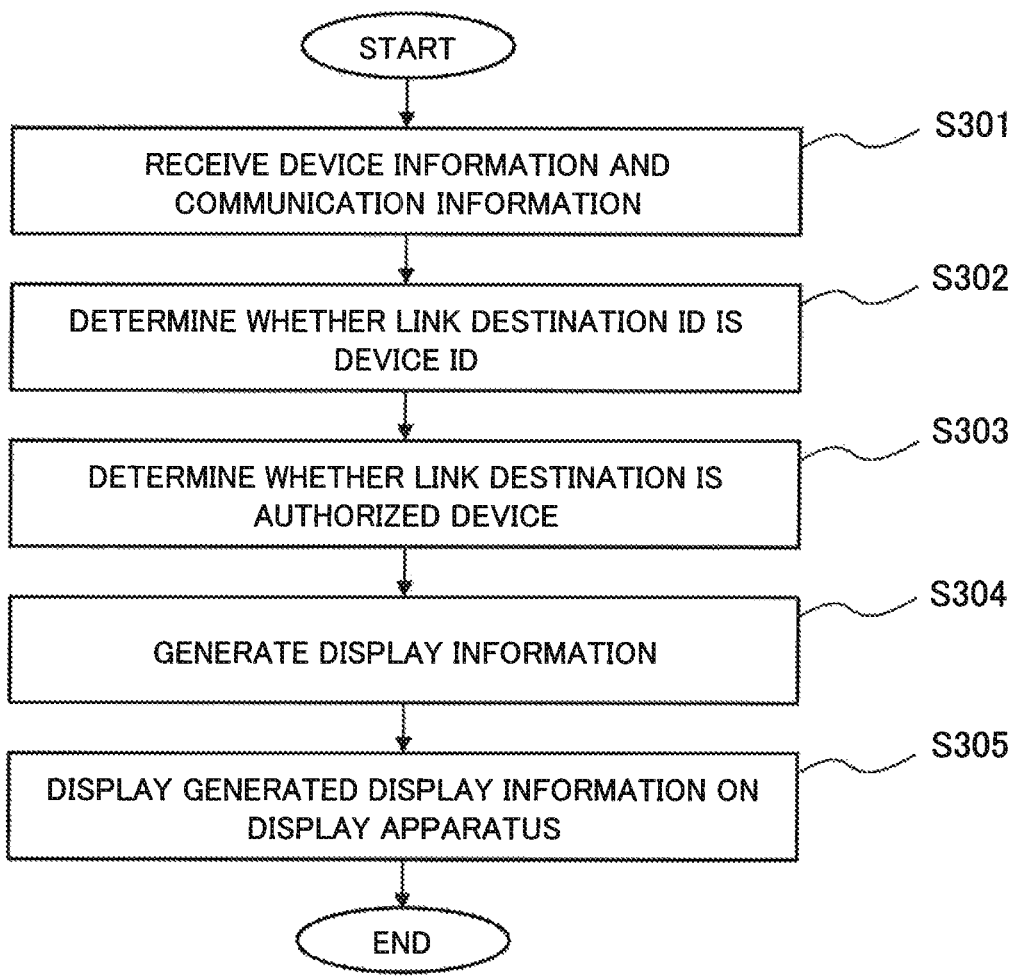
FIG. 13 is a flowchart illustrating a processing flow in the display control apparatus according to the third example embodiment.

Next, the display control apparatus 301 according to the third example embodiment will be described with reference to FIG. 13. FIG. 13 is a flowchart illustrating a processing flow in the display control apparatus 301 according to the third example embodiment.

The display control apparatus 301 receives device information and communication information transmitted by an agent 906 in an information processing apparatus 902 (Step S301).

For convenience of description, it is assumed that items similar to the link information exemplified in FIG. 10 (or FIG. 11) are associated with one another in device information and communication information, in the present example embodiment. Further, for convenience of description, received device information and received communication information are referred to as "link information" in the following description.

The type determination unit 303 reads a link target ID (a device ID in device information or a destination ID in communication information) included in the received link information (i.e. device information or communication information). The type determination unit 303 determines whether the read link target ID is a device ID or a processing apparatus ID of an information processing apparatus being a destination (Step S302). In other words, the type determination unit 303 determines whether the received device information is information generated in response to a device being linked to an information processing apparatus or the device information is information generated in response to an information processing apparatus communicating with another information processing apparatus.

The type determination unit 303 outputs the determination result in Step S302 to the display control unit 302. For example, when a link target ID is a device ID, the type determination unit 303 calculates a result indicating that the link target ID is a device ID (e.g. "device" or "1"). When the link target ID is not a device ID, the type determination unit 303 calculates a result indicating that the link target ID is not a device ID (e.g. "information processing apparatus" or "0").

The type determination unit 303 may further generate information where eighth to eleventh items are associated with one another. The items include:

Eighth item: a timing included in link information (exemplified in FIG. 10) (i.e. a timing when communication information is generated or a timing when device information is generated, in an information processing apparatus), Ninth item: a processing apparatus ID included in the link information (exemplified in FIG. 10), Tenth item: content information included in the link information (exemplified in FIG. 10), and Eleventh item: a type indicating whether a link target ID is a device ID or a processing apparatus ID (i.e. determination information in Step S302).

The type determination unit 303 may generate inspection information where a link target ID is further associated with the above-described eighth to eleventh items and output the generated inspection information to the display control unit 302.

A specific example of the processing indicated in Step S302 will be described later.

Next, the device authorizing unit 304 determines whether or not the link target ID is included in authorized device information stored in the authorized device information storage unit 305. In other words, the device authorizing unit 304 determines whether or not a link target identified by the link target ID is an authorized device (Step S303). When the type determination unit 303 determines that the link target ID is a device ID in Step S302, the device authorizing unit 304 executes the processing indicated in Step S303. When the link target ID is not a device ID, the type determination unit 303 may not execute the processing indicated in Step S303. In this case, the device authorizing unit 304 determines whether or not a device identified by the link target ID included in the link information (exemplified in FIG. 10) is an authorized device.

The device authorizing unit 304 outputs the determination result in Step S303 to the display control unit 302. For example, when a link target ID is a device ID of an authorized device, the device authorizing unit 304 calculates a result indicating that the device is an authorized device (e.g. "authorized" or "1"). When the link target ID is not a device ID of an authorized device, the device authorizing unit 304 calculates a result indicating that the device is not an authorized device (e.g. "unauthorized" or "0").

Alternatively, the device authorizing unit 304 may generate inspection information where determination information indicating whether or not the link target ID represents an authorized device ("authorization state" in FIG. 15) is further associated with the information where the above-described eighth to eleventh items are associated with one another.

The device authorizing unit 304 outputs the generated determination information (or inspection information) to the display control unit 302.

The display control unit 302 inputs the determination information output by the type determination unit 303 in Step S302 and the determination information output by the device authorizing unit 304 in Step S303. The display control unit 302 generates display information including the following items (Step S304). The items include:

a processing apparatus ID and a link target ID that are included in the received link information are associated with one another, and determination information about the link target ID is displayed near the link target ID. At least either of a type related to the link target ID and information indicating whether or not the link target ID represents an authorized device is displayed.

The display control unit 302 displays the generated display information on the display apparatus 910 (Step S305). Specifically, the display control unit 302 generates display information and displays the generated display information on the display apparatus 910 (Step S305). The display information associates the processing apparatus ID with the link target ID. In the display information, the determination information is arranged near the link target ID. Additionally, the display control unit 302 may generate inspection information (exemplified in FIG. 15) including the two types of determination information, on the basis of the determination information output by the type determination unit 303 and the determination information output by the device authorizing unit 304, and store the generated inspection information into the inspection information storage unit 310.

With regard to the processing indicated in Step S302 and the processing indicated in Step S303, either may be executed before the other.

The processing in Step S302 will be described in detail with reference to specific examples. Processing examples providing the processing in Step S302 include processing based on a drive name included in content information, processing based on a link target ID, and processing based on a processing content included in content information.

First, the processing in Step S302 based on a drive name will be described.

For example, the type determination unit 303 specifies path information indicating a storage area where a file is stored from content information in link information (exemplified in FIG. 10) and further specifies a drive name indicating a storage apparatus including the storage area from the specified path information. Next, the type determination unit 303 determines whether or not the specified drive name matches a drive name recognized as a removable device, and determines whether a link target ID associated with the content information is a device ID or a processing apparatus ID based on the determination result. For example, the determination processing is executed based on drive information including a drive name recognized as a removable device. In this case, the type determination unit 303 determines whether or not the specified drive name is included in the drive information and, thereby, determines whether or not the drive name matches a drive name recognized as a removable device.

Next, the processing related to Step S302 based on a link target ID will be described.

For example, it is assumed that a predetermined code (e.g. "USB") is set at a first character of a character string denoting a device ID, and a different code (e.g. "M") is set at a first character of a character string denoting a processing apparatus ID. In this case, the type determination unit 303 refers to a first character in a read link target ID and determines whether the read link target ID is a device ID or a processing apparatus ID.

Next, the processing related to Step S302 based on processing content will be described.

For convenience of description, it is assumed that an instruction for executing a communication is different from an instruction executed when a device is linked to an information processing apparatus. For example, an instruction for executing a communication includes "Send" indicating an instruction for transmitting data or "Receive" indicating an instruction for receiving data. On the other hand, an instruction executed when a device is linked to an information processing apparatus includes "Open" indicating an instruction for opening a file stored in the device. In this case, the type determination unit 303 determines whether content information includes the character string "Send" or the character string "Open" and determines whether the link target ID is a device ID or a processing apparatus ID based on the determination information. For example, when the content information includes the character string "Open," the type determination unit 303 determines that the read link target ID is a device ID.

Next, the processing in the display control apparatus 301 will be described with reference to the flowchart illustrated in FIG. 13 and the example of link information illustrated in FIG. 10. For example, it is assumed that the display control apparatus 301 receives link information exemplified in FIG. 10. More specifically, it is assumed that the display control apparatus 301 receives link information where a timing "2015/5/12_12:01:00," a processing apparatus ID "000001," a link target ID "USB-001," and content information "Open_E:¥home¥example.exe" are associated with one another. It is assumed that drive information includes information indicating a drive name (e.g. "E:," "F:," and "G:") recognized as a removable device.

When receiving the link information (exemplified in FIG. 10) (Step S301), the type determination unit 303 analyzes content information included in the received link information and specifies path information "Open_E:¥home¥example.exe". The type determination unit 303 further specifies a drive name "E:" out of the specified path information. The type determination unit 303 determines whether or not the drive information includes the specified drive name "E:" (Step S302). When the drive information includes the specified drive name, the type determination unit 303 calculates "1" (or e.g. "device") indicating that the link target ID is a device ID, as determination information. When the drive information does not include the specified drive name, the type determination unit 303 generates determination information "00" indicating that the link target ID is not a device ID and the link target ID is not an authorized device, as determination information. In this example, since the content information "Open_E:¥home¥example.exe" includes the drive name "E:," the type determination unit 303 calculates "1" indicating that the link target ID is a device ID, as determination information.

When the link target ID is a device ID, the device authorizing unit 304 determines whether or not authorized device information includes the link target ID (the link target ID "USB-001" in this example) (Step S303). When the authorized device information includes the read link target ID, the device authorizing unit 304 calculates "1" (or e.g. "authorized") indicating that a device identified by the link target ID is an authorized device, as determination information. When the authorized device information does not include the read link target ID, the device authorizing unit 304 calculates "0" (or e.g. "unauthorized") indicating that the device identified by the link target ID is not an authorized device, as determination information.

For example, the authorized device information exemplified in FIG. 14 includes device IDs "USB-001," "USB-002," and "USB-003." Accordingly, in this example, the authorized device information includes the link target ID "USB-001," and therefore the device authorizing unit 304 determines that a device identified by the link target ID "USB-001" is an authorized device. Accordingly, the device authorizing unit 304 calculates "1" (or e.g. "authorized") indicating that the device identified by the link target ID is an authorized device, as determination information.

In other words, in the above-described example, the display control apparatus 301 calculates one piece of information out of determination information "00" indicating that the link target ID is an information processing apparatus, determination information "10" indicating that a link target identified by the link target ID is an unauthorized device, and determination information "11" indicating that a link target identified by the link target ID is an authorized device, as determination information. For example, when conforming to a mode similar to the inspection information illustrated in FIG. 16, the determination information "00" indicates that the link target ID has a type "information processing apparatus" and an authorization state "unauthorized." The determination information "10" indicates that the link target ID has a type "device" and an authorization state "unauthorized." The determination information "11" indicates that the link target ID has a type "device" and an authorization state "authorized."

The determination information is not limited to the above-described example. Instead of a bit string, the determination information may include information indicating whether or not a read link target ID is a device ID (e.g. "TRUE" or "FALSE") and information indicating whether or not a device identified by the link target ID is an authorized device (e.g. "TRUE" or "FALSE"), the pieces of information being separated by use of a comma (",").

The display control unit 302 receives information being "device" calculated by the type determination unit 303 and "authorized" calculated by the device authorizing unit 304, and generates display information including the received information (Step S304). The display control unit 302 displays the generated display information on the display apparatus 910 (Step S305).

Next, an advantageous effect of the display control apparatus 301 according to the third example embodiment will be described.

The display control apparatus 301 according to the present example embodiment can generate display information for specifying an event occurring in the information processing system 901 easily. The reason is similar to the reason described in the first example embodiment.

The display control apparatus 301 according to the present example embodiment is able to generate display information easily understandable to a user. The reason is that the display control apparatus 301 generates display information for showing information indicating a type of a link target. Consequently, the user refers to the type and can understand whether processing is processing through a communication network or processing through a device.

The display control apparatus 301 according to the present example embodiment enables a user to easily find a device to be focused when observing the information processing system 901. The reason is that the display control apparatus 301 generates display information for showing whether a link target is authorized or unauthorized when displaying the link target ID. Consequently, the user refers to whether the display information indicates an authorized or unauthorized device and can easily find a link target to be focused.

Fourth Example Embodiment

Next, a fourth example embodiment of the present invention based on the above-described first example embodiment will be described.

In the following description, a part characteristic of the present example embodiment is mainly described, and a same reference numeral is given to a similar configuration described in the above-described first example embodiment, thus omitting redundant description thereof.

Figure 17:
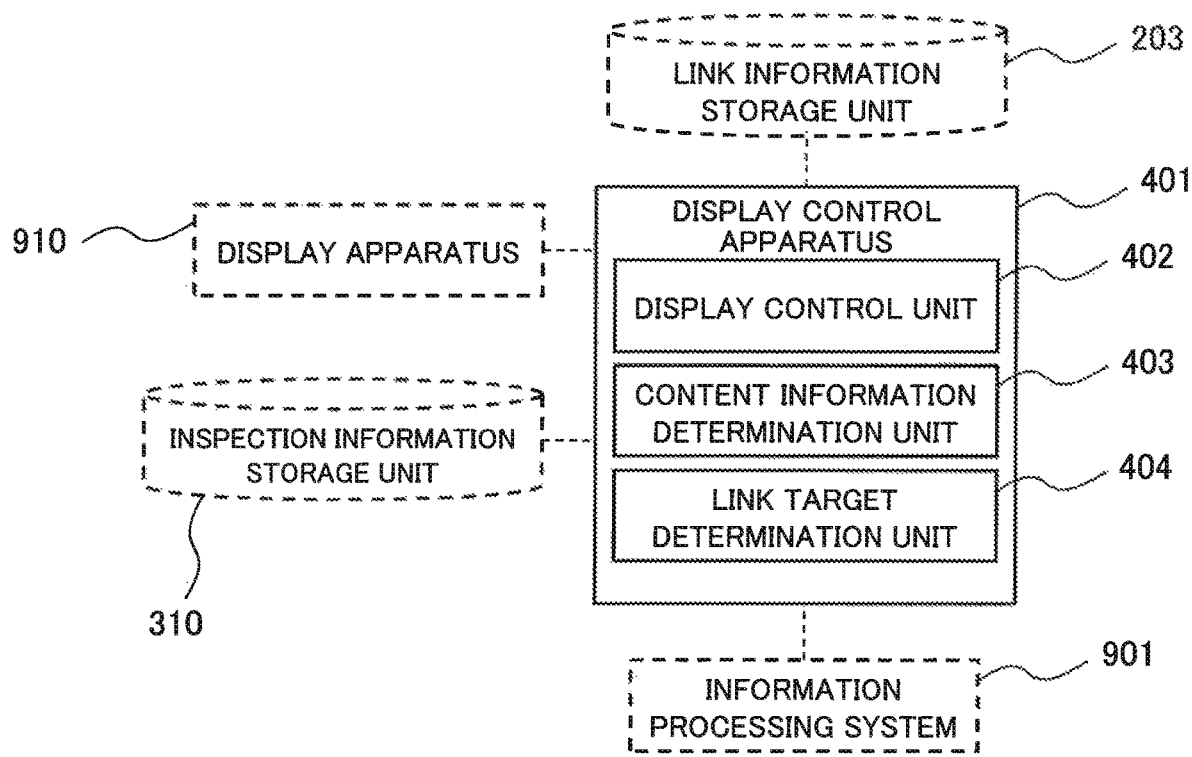
FIG. 17 is a block diagram illustrating a configuration of a display control apparatus according to a fourth example embodiment of the present invention.

A configuration of a display control apparatus 401 according to the fourth example embodiment of the present invention will be described in detail with reference to FIG. 17. FIG. 17 is a block diagram illustrating a configuration of the display control apparatus 401 according to the fourth example embodiment of the present invention.

The display control apparatus 401 according to the fourth example embodiment includes a display control unit (display controller) 402, a content information determination unit (content information determiner) 403, and a link target determination unit (link target determiner) 404. The display control apparatus 401 can generate, refer to, or update link information (exemplified in FIG. 11) stored (to be stored) in a link information storage unit 203. The display control apparatus 401 can display generated display information on a display apparatus 910.

Figure 18:
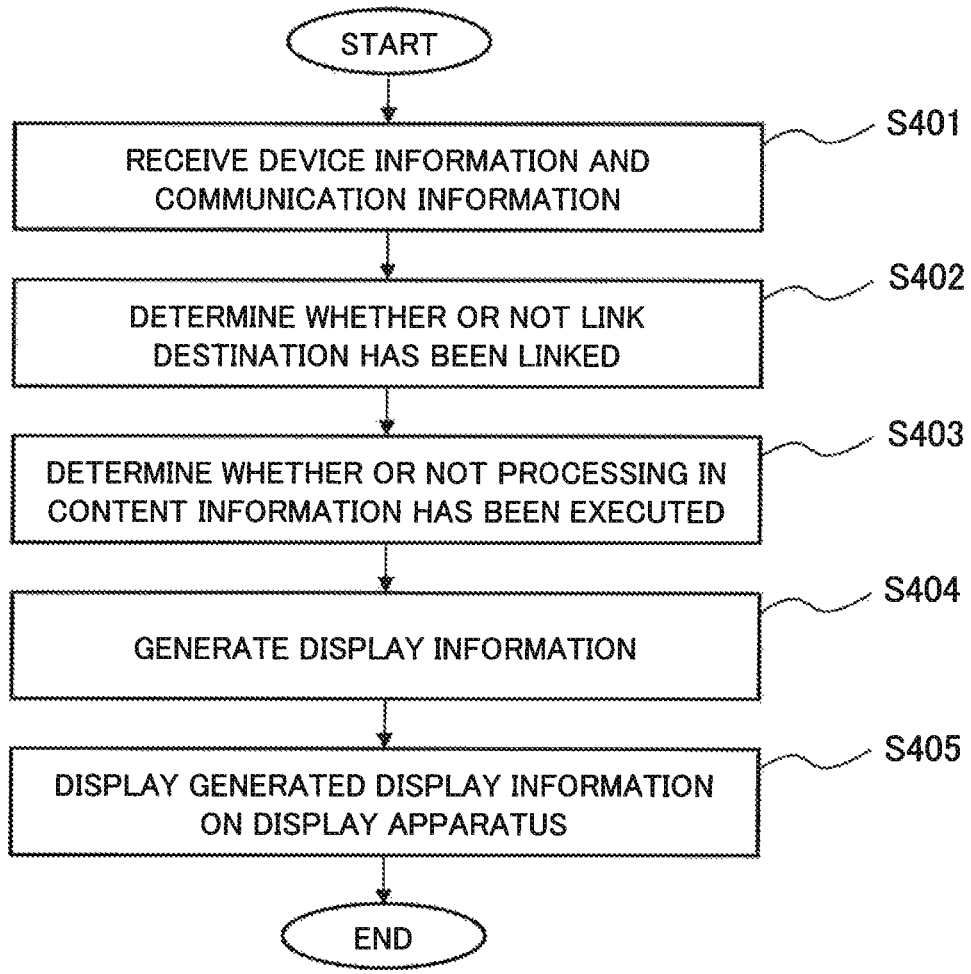
FIG. 18 is a flowchart illustrating a flow of processing executed by the display control apparatus according to the fourth example embodiment.

Next, processing in the display control apparatus 401 according to the fourth example embodiment will be described with reference to FIG. 18. FIG. 18 is a flowchart illustrating a flow of processing executed by the display control apparatus 401 according to the fourth example embodiment.

The display control apparatus 401 receives device information and communication information transmitted by an agent 906 in an information processing apparatus 902 (Step S401).

For convenience of description, it is assumed that items similar to the link information exemplified in FIG. 10 are associated with one another in device information and communication information in the present example embodiment. Further, received device information and received communication information are collectively referred to as "link information" in the present example embodiment. In this case, the display control apparatus 401 receives link information (FIG. 10) in the processing indicated in Step S401.

Next, the link target determination unit 404 determines whether or not a link target identified by a link target ID in the link information has been linked to any information processing apparatus in an information processing system 901 (Step S402). When determining that the link target has been linked to some information processing apparatus, the link target determination unit 404 generates determination information (e.g. "1" or "registered") indicating that the link target has been linked in the information processing system 901. When determining that the link target has not been linked to any information processing apparatus, the link target determination unit 404 generates determination information (e.g. "0" or "new") indicating that the link target has not been linked in the information processing system 901.

The link target determination unit 404 outputs the generated determination information to the display control unit 402.

For example, in the processing indicated in Step S402, the link target determination unit 404 determines whether or not a link target ID in the received link information (exemplified in FIG. 10) is included in link information (exemplified in FIG. 11). When the link target ID in the received link information is included in the link information (exemplified in FIG. 11), the link target determination unit 404 generates determination information indicating that the link target has been linked in the information processing system 901. When the link target ID in the received link information is not included in the link information (exemplified in FIG. 11), the link target determination unit 404 generates determination information indicating that the link target has not been linked in the information processing system 901.

Next, the content information determination unit 403 determines whether or not processing indicated by content information in the link information has been executed by any information processing apparatus in the information processing system 901 (Step S403). When determining that the processing indicated by the content information has been executed by some information processing apparatus, the content information determination unit 403 generates determination information (e.g. "0" or "registered") indicating that the processing indicated by the content information has been executed in the information processing system 901. When determining that the processing indicated by the content information has not been executed by any information processing apparatus, the content information determination unit 403 generates determination information (e.g. "1" or "new") indicating that the processing indicated by the content information has not been executed in the information processing system 901. The content information determination unit 403 outputs the generated determination information to the display control unit 402.

For example, in the processing indicated in Step S403, the content information determination unit 403 determines whether or not content information in the received link information is included in the link information (exemplified in FIG. 11). When the content information in the received link information is included in the link information (exemplified in FIG. 11) stored in the link information storage unit 203, the content information determination unit 403 generates determination information (e.g. "0" or "registered") indicating that processing indicated by the content information has been executed in the information processing system 901. When the content information in the received link information is not included in the link information (exemplified in FIG. 11) stored in the link information storage unit 203, the content information determination unit 403 generates determination information (e.g. "1" or "new") indicating that the processing indicated by the content information has not been executed in the information processing system 901.

In the following description, determination information generated by the content information determination unit 403 and determination information generated by the link target determination unit 404 may also be referred to as "operation change information."

The display control unit 402 inputs the determination information output by the link target determination unit 404 and the determination information output by the content information determination unit 403. The display control unit 402 executes processing similar to the processing indicated in Step S304 and, thereby, generates display information including at least either of the determination information output by the link target determination unit 404 and the determination information output by the content information determination unit 403 (Step S404). The display control unit 402 displays the generated display information on the display apparatus 910 (Step S405). By the processing, the display control unit 402 displays, on the display apparatus 910, information where a plurality of information processing apparatuses communicating with one another are associated with one another, information where an information processing apparatus and a device linked to the information processing apparatus are associated with each other, determination information about a link target, and determination information about content information. For example, the display control unit 402 may display determination information about a link target around the link target on the display apparatus 910. For example, the display control unit 402 may display determination information about content information around information where an information processing apparatus and a device between which processing indicated by the content information are executed are associated with one another, or information where a plurality of information processing apparatuses executing processing indicated by the content information are associated with one another.

The display control unit 402 stores the link information received by the display control apparatus 401 into the link information storage unit 203. The processing of storing the link information into the link information storage unit 203 has only to be executed after the processing indicated in Steps S402 and S403 and may be executed by a component such as the content information determination unit 403.

The display control unit 402 may further generate inspection information where twelfth to seventeenth items are associated with one another. The items include:

Twelfth item: a timing in link information (exemplified in FIG. 10),

Thirteenth item: a processing apparatus ID in the link information (exemplified in FIG. 10), Fourteenth item: a link target ID in the link information (exemplified in FIG. 10), Fifteenth item: content information in the link information (exemplified in FIG. 10), Sixteenth item: information indicating whether or not a link target identified by the link target ID has been linked (i.e. determination information in Step S402), and Seventeenth item: information indicating whether or not processing indicated by content information in the link information has been executed (i.e. determination information in Step S403).

The display control unit 402 may generate inspection information where the twelfth to seventeenth items, a type of a link target identified by the link target ID (the determination result in Step S302 in FIG. 13) and whether or not the link target identified by the link target ID is an authorized device (the determination result in Step S303 in FIG. 13) are associated with one another, as illustrated in FIG. 19. FIG. 19 is a diagram conceptually illustrating an example of inspection information.

Next, processing executed by the display control apparatus 401 according to the fourth example embodiment when receiving each piece of information illustrated in FIGS. 10 and 20 to 22 will be described.

For convenience of description, it is assumed that items similar to the items exemplified in FIG. 10 are associated with one another in device information and communication information in the present example embodiment. Further, in the following description, received device information and received communication information are collectively referred to as "link information." It is assumed that the link information storage unit 203 stores the link information exemplified in FIG. 11.

First, processing executed by the display control apparatus 401 when receiving the link information exemplified in FIG. 10 will be described.

The content information determination unit 403 reads content information "Open_E:¥home¥example.exe" from the received link information (exemplified in FIG. 10). Next, the content information determination unit 403 determines whether or not the read content information "Open_E:¥home¥example.exe" is included in the link information (exemplified in FIG. 11) stored in the link information storage unit 203. In this case, content information in the second row in FIG. 11 matches the read content information "Open_E:¥home¥example.exe," and therefore the content information determination unit 403 determines that processing indicated by the content information has been executed in the information processing system 901. In this case, the content information determination unit 403 generates determination information (e.g. "0," "registered," or "normal") indicating that the processing indicated by the content information in the link information has been executed in the information processing system 901.

The link target determination unit 404 reads a link target ID "USB-001" from the received link information (exemplified in FIG. 10). Next, the link target determination unit 404 determines whether or not the read link target ID "USB-001" is included in the link information (exemplified in FIG. 11) stored in the link information storage unit 203. In this case, a link target ID in the second row in FIG. 11 matches the read link target ID "USB-001," and therefore the link target determination unit 404 determines that a link target identified by the read link target ID "USB-001" has been linked to the information processing system 901. In this case, the link target determination unit 404 generates determination information (e.g. "0," "registered," or "normal") indicating that the link target has been linked to the information processing system 901.

Next, processing executed by the display control apparatus 401 when receiving link information exemplified in FIG. 20 will be described. FIG. 20 is a diagram conceptually illustrating an example of link information.

The content information determination unit 403 reads content information "Open_E:¥home¥virus.exe" from the received link information (exemplified in FIG. 20). Next, the content information determination unit 403 determines whether or not the read content information "Open_E:¥home¥virus.exe" is included in the link information (exemplified in FIG. 11) stored in the link information storage unit 203. In this case, the read content information "Open_E:¥home¥virus.exe" is not included in the link information (exemplified in FIG. 11), and therefore the content information determination unit 403 determines that processing indicated by the content information has not been executed in the information processing system 901. In this case, the content information determination unit 403 generates determination information (e.g. "1," "new," or "abnormal") indicating that the processing indicated by the content information in the link information has not been executed in the information processing system 901.

The link target determination unit 404 reads a link target ID "USB-001" from the received link information (exemplified in FIG. 20). Next, the link target determination unit 404 determines whether or not the read link target ID "USB-001" is included in the link information (exemplified in FIG. 11) stored in the link information storage unit 203. In this case, a link target ID in the second row in FIG. 11 matches the read link target ID "USB-001," and therefore the link target determination unit 404 determines that a link target identified by the read link target ID "USB-001" has been linked to the information processing system 901. In this case, the link target determination unit 404 generates determination information (e.g. "0," "registered," or "normal") indicating that the link target has been linked to the information processing system 901.

Next, processing executed by the display control apparatus 401 when receiving link information exemplified in FIG. 21 will be described. FIG. 21 is a diagram conceptually illustrating an example of link information.

The content information determination unit 403 reads content information "Open_E:¥home¥picture.png" from the received link information (exemplified in FIG. 21). Next, the content information determination unit 403 determines whether or not the read content information "Open_E:¥home¥picture.png" is included in the link information (exemplified in FIG. 11) stored in the link information storage unit 203. In this case, content information in the fourth row in FIG. 11 matches the read content information "Open_E:¥home¥picture.png," and therefore the content information determination unit 403 determines that processing indicated by the content information has been executed in the information processing system 901. In this case, the content information determination unit 403 generates determination information (e.g. "0," "registered," or "normal") indicating that the processing indicated by the content information in the link information has been executed in the information processing system 901.

The link target determination unit 404 reads a link target ID "USB-003" from the received link information (exemplified in FIG. 21). Next, the link target determination unit 404 determines whether or not the read link target ID "USB-003" is included in the link information (exemplified in FIG. 11) stored in the link information storage unit 203. In this case, the read link target ID "USB-003" is not included in the link information (exemplified in FIG. 11), and therefore the link target determination unit 404 determines that a link target identified by the read link target ID "USB-003" has not been linked to the information processing system 901. In this case, the link target determination unit 404 generates determination information (e.g. "1," "new," or "abnormal") indicating that the link target has not been linked to the information processing system 901.

Next, processing executed by the display control apparatus 401 when receiving link information exemplified in FIG. 22 will be described. FIG. 22 is a diagram conceptually illustrating an example of link information.

The content information determination unit 403 reads content information "Open_E:¥home¥hoge.png" from the received link information (exemplified in FIG. 22). Next, the content information determination unit 403 determines whether or not the read content information "Open_E:¥home¥hoge.png" is included in the link information (exemplified in FIG. 11) stored in the link information storage unit 203. In this case, the read content information "Open_E:¥home¥hoge.png" is not included in the link information (exemplified in FIG. 11), and therefore the content information determination unit 403 determines that processing indicated by the content information has not been executed in the information processing system 901. In this case, the content information determination unit 403 generates determination information (e.g. "1," "new," or "abnormal") indicating that the processing indicated by the content information in the link information has not been executed in the information processing system 901.

The link target determination unit 404 reads a link target ID "USB-003" from the received link information (exemplified in FIG. 22). Next, the link target determination unit 404 determines whether or not the read link target ID "USB-003" is included in the link information (exemplified in FIG. 11) stored in the link information storage unit 203. In this case, the read link target ID "USB-003" is not included in the link information (exemplified in FIG. 11), and therefore the link target determination unit 404 determines that a link target identified by the read link target ID "USB-003" has not been linked to the information processing system 901. In this case, the link target determination unit 404 generates determination information (e.g. "1," "new," "abnormal") indicating that the link target has not been linked to the information processing system 901.

For example, the display control apparatus 401 may show display information exemplified in FIG. 23 or 24 on the display apparatus 910. FIGS. 23 and 24 are diagrams illustrating examples of display information.

First, the display information exemplified in FIG. 23 will be described.

For example, in display information, a processing apparatus ID of an information processing apparatus, a link target ID of a link target linked to the information processing apparatus, content information indicating processing executed between the information processing apparatus and the link target, and a timing when the processing is executed are associated with one another. Additionally, in the display information, a "content state" indicating whether or not the content information has been executed in the information processing system 901 and an "authorization state" indicating whether or not the link target is an authorized device are associated with the above-described information. The timing, the processing apparatus ID, the link target ID, and the content information are included in link information (i.e. device information or communication information) received by the display control apparatus 401. The "content state" and the "authorization state" are included in determination information generated by the information processing apparatus.

For example, in the display information exemplified in FIG. 23, an authorization state "N," a content state "normal," a timing "2015/5/12_12:01:00," a processing apparatus ID "000002," a link target ID "USB-010," and content information "Open_E:¥home¥example.exe" are associated with one another. This indicates that a link target identified by the link target ID "USB-010" is linked to an information processing apparatus identified by the processing apparatus ID "000002" at the timing "2015/5/12_12:01:00," and processing being the content information "Open_E:¥home¥example.exe" is executed. This further indicates that an authorization state related to the link target ID "USB-010" is "N" ("N" denoting an unauthorized device and "Y" denoting an authorized device), and the processing being the content information "Open_E:¥home¥example.exe" has been executed in the information processing system 901.

Next, the display information exemplified in FIG. 24 will be described.

In the display information, link target IDs are arranged in a lateral direction, and processing apparatus IDs are arranged in a longitudinal direction. For example, the link target IDs arranged in a lateral direction include "000001," "000002," and "000003." The processing apparatus IDs arranged in a longitudinal direction include "000001," "000002," and "000003." A display area arranged in a downward direction from a processing apparatus ID and in a rightward direction from a link target ID displays determination information about processing executed between an information processing apparatus identified by the processing apparatus ID and a link target identified by the link target ID.

For example, a display area arranged in a rightward direction from the processing apparatus ID "000002" and in a downward direction from a link target ID "USB-001" displays "A." This indicates that determination information about processing executed between an information processing apparatus identified by the processing apparatus ID "000002" and a link target identified by the link target ID "USB-001" is "A."

For example, the determination information "A" indicates that the link target ID is not new (is normal), and content information about processing executed between the information processing apparatus and the link target is not new (is normal). For example, determination information "B" indicates that the link target ID is new (is abnormal) and content information about processing executed between the information processing apparatus and the link target is not new (is normal). For example, determination information "C" indicates that the link target ID is not new (is normal) and content information about processing executed between the information processing apparatus and the link target is new (is abnormal). For example, determination information "D" indicates that the link target ID is new (is abnormal) and content information about processing executed between the information processing apparatus and the link target is new (is abnormal). Determination information being a null value " " indicates that processing is not executed between the information processing apparatus and the link target.

The display information exemplified in FIG. 23 or 24 enables a user to easily find a link target (a device or an information processing apparatus) to be focused when observing the information processing system 901. The reason is that display information generated by the display control apparatus 401 according to the present example embodiment displays whether or not processing is executed between a processing apparatus ID and a link target ID, whether or not a link target identified by a link target ID is an authorized device, and whether or not executed processing is normal.

Next, an advantageous effect of the display control apparatus 401 according to the fourth example embodiment will be described.

The display control apparatus 401 according to the present example embodiment is able to generate display information for specifying an event occurring in the information processing system 901 easily. The reason is similar to the reason described in the first example embodiment.

The display control apparatus 401 according to the present example embodiment enables a user to easily specify a link target (a device or an information processing apparatus) to be focused when observing the information processing system 901. The reason is that the display control apparatus 401 determines whether or not a link target has been linked to the information processing system 901 and displays the determination result. Consequently, for example, the user looks for a link target with the determination information indicating "new" out of link targets in the information processing system 901 and can easily specify a link target to be focused.

The display control apparatus 401 according to the present example embodiment enables a user to easily specify a link target transmitting and receiving (or inputting and outputting) content information to be focused when observing the information processing system 901. The reason is that the display control apparatus 401 determines whether or not processing indicated by content information has been executed in the information processing system 901 and displays the determination result. Consequently, for example, the user looks for a link target with the content information indicating "new" out of link targets in the information processing system 901 and can easily specify a link target to be focused.

Fifth Example Embodiment

Next, a display control apparatus displaying information indicating processing executed between a plurality of information processing apparatuses and information indicating processing executed between an information processing apparatus and a device linked to the information processing apparatus will be described.

Figure 25:
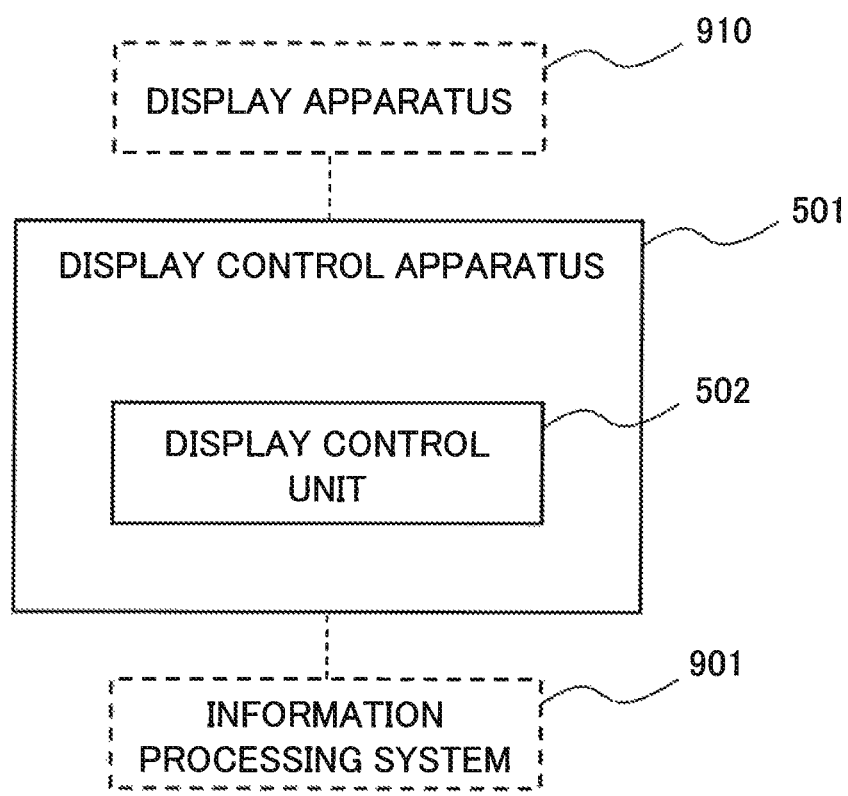
FIG. 25 is a block diagram illustrating a configuration of a display control apparatus according to a fifth example embodiment of the present invention.

A configuration of a display control apparatus 501 according to a fifth example embodiment and processing in the display control apparatus 501 will be described with reference to FIG. 25. FIG. 25 is a block diagram illustrating a configuration of the display control apparatus 501 according to the fifth example embodiment of the present invention.

The display control apparatus 501 according to the fifth example embodiment includes a display control unit (display controller) 502. The display control apparatus 501 can display generated display information 510 (to be described later with reference to FIG. 26) on a display apparatus 910.

The display control apparatus 501 inputs information where individual processing apparatus ID representing each information processing apparatus executing a communication are associated with one another and information where a processing apparatus ID of an information processing apparatus and a device ID of a device linked to the information processing apparatus are associated with each other. For example, information input to the display control apparatus 501 is the inspection information exemplified in FIG. 19.

Figure 26:
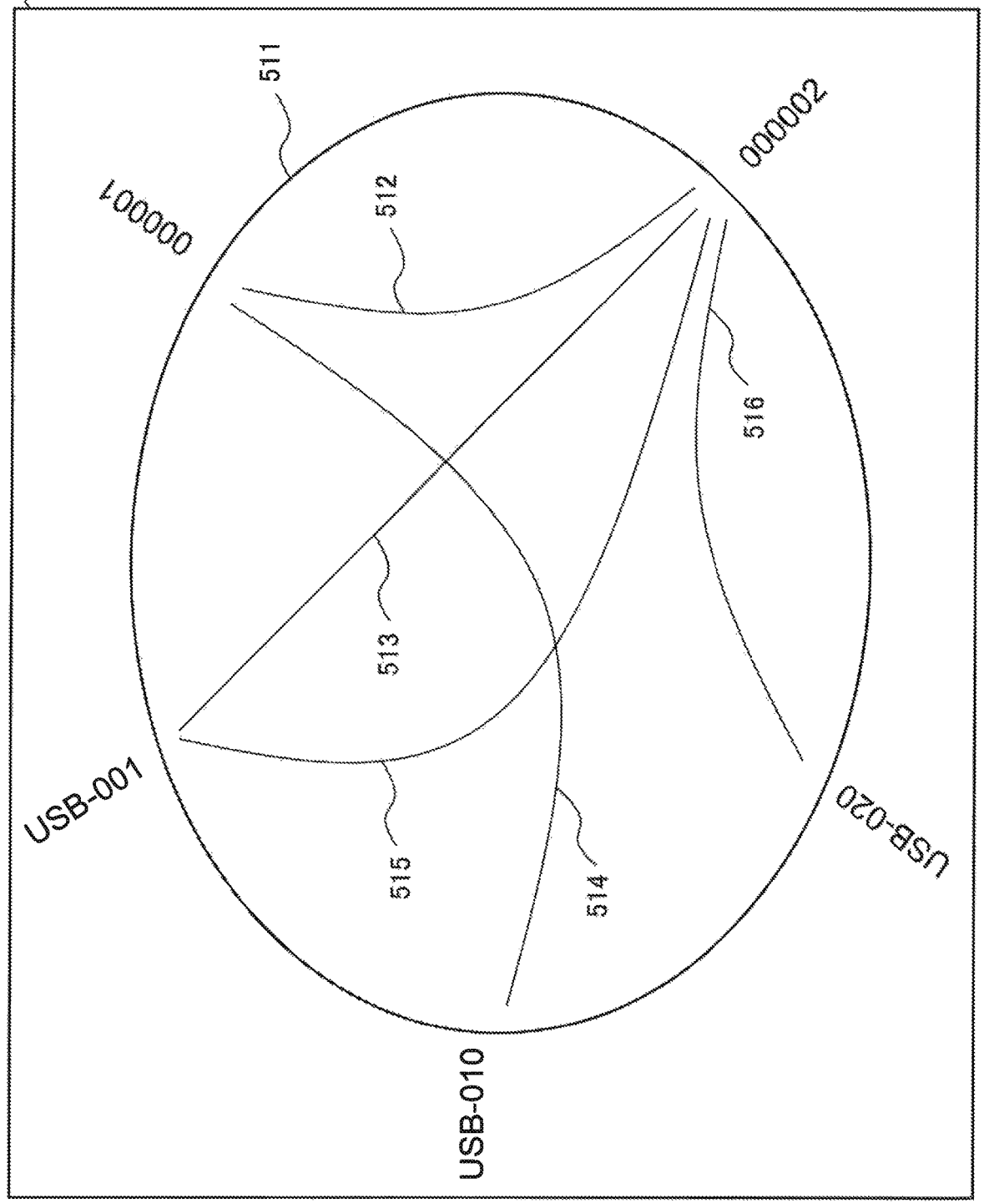
FIG. 26 is a diagram illustrating an example of display information displayed on a display apparatus by the display control apparatus according to the fifth example embodiment.

As exemplified in FIG. 26, the display control unit 502 displays, on the display apparatus 910, a processing apparatus ID of an information processing apparatus in an information processing system 901 and a device ID of a device linked in the information processing system 901, in accordance with a mode of arranging the IDs around (in a vicinity of, in a neighborhood of) an area (hereinafter referred to as a "first area 511"). In other words, the display control unit 502 displays information indicating an information processing apparatus and information indicating a device on the display apparatus 910, in accordance with the above-described mode. FIG. 26 is a diagram illustrating an example of display information 510 displayed on the display apparatus 910 by the display control apparatus 501 according to the fifth example embodiment.

The display control unit 502 according to the present example embodiment displays a processing apparatus ID and a device ID outside a first area 511. However, the display control unit 502 may not necessarily display the processing apparatus ID and the device ID outside the first area 511 and may display the IDs inside (or on the boundary of) the first area 511.

The display control unit 502 displays inside the first area 511 information indicating a communication between a plurality of information processing apparatuses, in accordance with a mode of connecting (joining, linking) processing apparatus IDs representing the respective information processing apparatuses (e.g. a mode of being connected by a line 512). Additionally, the display control unit 502 displays, inside the first area 511, information indicating processing executed between an information processing apparatus and a device linked to the information processing apparatus, in accordance with a mode of connecting (joining, linking) a processing apparatus ID of the information processing apparatus to a device ID of the device. For example, the display control unit 502 performs display in accordance with a mode of being connected by lines 513 to 516.

In the display information illustrated in FIG. 26, "000001" and "000002" indicate processing apparatus IDs. "USB-001," "USB-010," and "USB-020" indicate device IDs. In the display information 510 illustrated in FIG. 26, the line 512 represents information indicating a communication executed between a plurality of information processing apparatuses. Further, each of the lines 513 to 516 represents information indicating processing executed between an information processing apparatus and a device linked to the information processing apparatus. In other words, the first area 511 indicates an area where information about a communication executed between a plurality of nodes and information indicating processing executed between an information processing apparatus and a device linked to the information processing apparatus can be displayed.

The display control unit 502 may not necessarily display the first area 511 explicitly. Further, the "connecting (joining, linking) mode" does not need to be adjacent to a processing apparatus ID (or a device ID), and for example, has only to be displayed in a vicinity of a node in such a way to be understandable for a user. Further, the "connecting mode" does not need to be a curved line, and for example, may be a straight line or any display mode understandable to a user.

In the display information 510 illustrated in FIG. 26, the first area 511 has an elliptic shape or a nearly elliptic shape. For example, the first area 511 may have a convex shape or a nearly convex shape. In the present invention, a convex shape refers to a shape inside which a segment connecting (joining, linking) two points included inside the convex shape is included. Additionally, for example, the first area 511 may have a circular shape, an elliptic shape, a polygonal shape, or a nearly polygonal shape.

For example, when a polygonal shape is a regular polygonal shape, the display control apparatus 501 may display an ID (a processing apparatus ID or a device ID), in accordance with a display mode of arranging an ID at each vertex constituting the regular polygonal shape. In this case, the display control apparatus 501 enables a user to easily understand a state in the information processing system 901. The reason is that spaces between a plurality of IDs are equal (nearly equal), and therefore spaces between lines connecting (joining, linking) the plurality of IDs are wider.

Next, an advantageous effect of the display control apparatus 501 according to the fifth example embodiment will be described.

The display control apparatus 501 according to the present example embodiment is able to generate display information for specifying an event occurring in the information processing system 901 easily. The reason is that the display control apparatus 501 according to the fifth example embodiment displays, on the display apparatus 910, not only information about a communication in the information processing system 901 but also information about a device linked to an information processing apparatus in the information processing system 901. The reason will be described in more detail.

When inputting data from outside, the information processing apparatus executes at least either processing of receiving the data through a communication network and inputting the data through a device linked to the information processing apparatus. Accordingly, an attack from outside to the information processing apparatus is, at least, either through the communication network or through a device linked to the information processing apparatus.

The display control apparatus 501 according to the present example embodiment displays, on the display apparatus 910, display information where a plurality of information processing apparatuses are associated with one another and display information where an information processing apparatus and a device linked to the information processing apparatus are associated with each other and, thereby, displays processing executed through the above-described two paths. In other words, the display control apparatus 501 displays the two types of display information on the display apparatus 910, as information indicating the processing (or the communication) executed through the two paths. Accordingly, a user is able to comprehensively understand processing executed between each information processing apparatus and the outside on the basis of display information generated by the display control apparatus 501 according to the present example embodiment.

By contrast, the apparatus disclosed in PTL 4, PTL 5, or NPL 1 only displays an event (e.g. a communication network) to be a target with respect to an information processing apparatus. Accordingly, when observing processing executed in the information processing system, a user must refer to every piece of information individually displayed by each apparatus with respect to the information processing system with the apparatus. In other words, the apparatus disclosed in PTL 4, PTL 5, or NPL 1 cannot offer easily understandable information for processing executed between each information processing apparatus and the outside.

Further, the display control apparatus 501 according to the fifth example embodiment can display information in accordance with a display mode with high viewability. The reason is that the display control apparatus 501 separately displays a body such as an information processing apparatus and a device, and processing executed in the information processing system 901.

More specifically, for example, the display control unit 502 displays, around the first area 511 having a circular shape, IDs (a processing apparatus ID and a device ID) outside the first area 511, and information about processing executed in the information processing system 901 inside the first area 511 as a line. Accordingly, the display control unit 502 can display a body such as an information processing apparatus and a device, and information about processing executed in the information processing system 901 without overlapping each other. The advantageous effect is not limited to a case of the first area 511 having a circular shape and holds similarly in a case that the area has a polygonal shape, a convex shape, or a nearly convex shape, or in a case that three-dimensional display is performed.

Further, when the first area 511 has a convex shape or a nearly convex shape, the display control apparatus 501 according to the fifth example embodiment can display information in accordance with a display mode with yet higher viewability. The reason is that, for example, by use of a straight line or a nearly straight line as the line 513, information about processing executed in the information processing system 901 can be displayed inside the first area 511 having a convex shape or a nearly convex shape, in accordance with a display mode with yet higher viewability.

Specifically, since the first area 511 has a convex shape or a nearly convex shape, a total length of displayed lines connecting a plurality of IDs (a processing apparatus ID and a device ID) is shorter, compared with, for example, a case that IDs are arranged and displayed in one direction. More specifically, for example, when processing executed in the information processing system is displayed as a line connecting IDs executing the processing when IDs are arranged and displayed in one direction, a display state exhibits a tangle of lines representing the processing. In a particular case of processing being executed between targets (an information processing apparatus or a device) identified by IDs arranged at both ends when IDs are arranged in one direction, a line connecting the IDs becomes longest. By contrast, in the display information exemplified in FIG. 26, a line connecting IDs is short regardless of positions where the ID are arranged and therefore can be easily understandable for a user. Accordingly, information about a communication is briefly displayed, and therefore the user is able to easily specify an ID and processing executed between a plurality of IDs.

When the display control unit 502 performs three-dimensional display, the first area 511 may have a three-dimensional shape. For example, the first area 511 may be a curved body including a spherical shape, a nearly spherical shape, a polyhedral shape, a nearly polyhedral shape, an ellipsoidal shape, a nearly ellipsoidal shape, or a convex shape, or a curved body including a nearly convex shape.

Further, the display control apparatus 501 may execute the processing performed by the display control apparatus according to the above-described first to fourth example embodiments of the present invention and then execute the processing described in the present example embodiment.

Sixth Example Embodiment

Next, a sixth example embodiment of the present invention based on the above-described fifth example embodiment will be described.

In the following description, a part characteristic of the present example embodiment is mainly described, and a same reference numeral is given to a similar configuration described in the above-described first example embodiment, thus omitting redundant description thereof.

Figure 27:
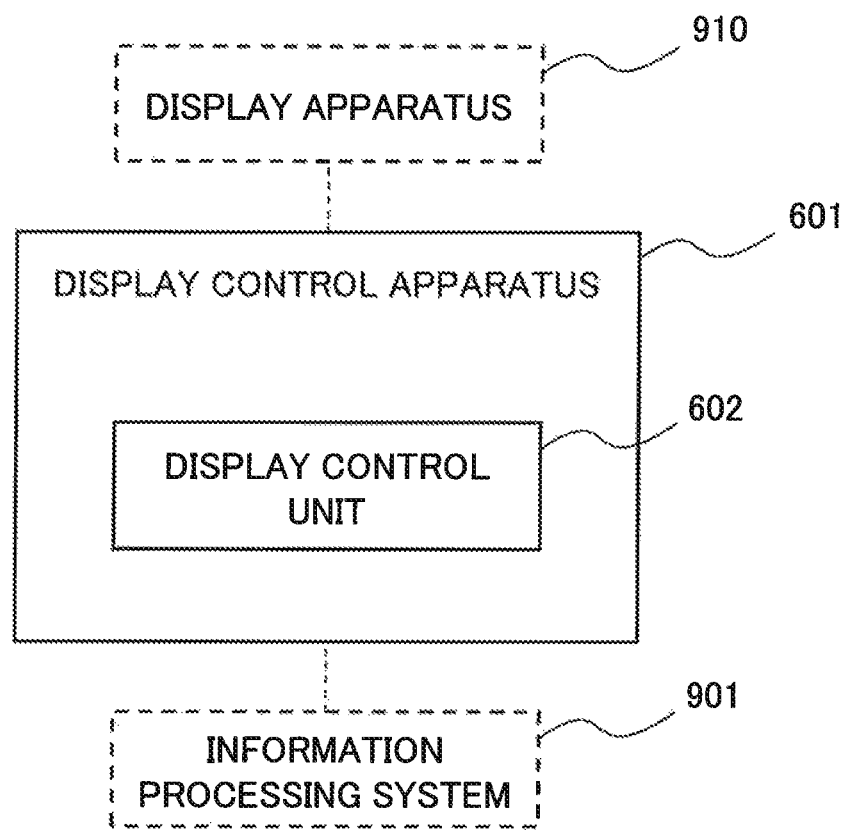
FIG. 27 is a block diagram illustrating a configuration of a display control apparatus according to a sixth example embodiment of the present invention.

A configuration of a display control apparatus 601 according to the sixth example embodiment and processing performed by the display control apparatus 601 will be described with reference to FIG. 27. FIG. 27 is a block diagram illustrating a configuration of the display control apparatus 601 according to the sixth example embodiment of the present invention.

The display control apparatus 601 according to the sixth example embodiment includes a display control unit (display controller) 602. The display control apparatus 601 can display generated display information 610 (to be described later with reference to FIG. 28) on a display apparatus 910.

The display control apparatus 601 inputs inspection information as exemplified in FIG. 19. In the inspection information illustrated in FIG. 19, a link target ID is a processing apparatus ID or a device ID. However, inspection information input by the display control apparatus 601 may not necessarily include a timing and content information.

The display control unit 602 displays, on the display apparatus 910, information similarly to the display control apparatus 501 according to the fifth example embodiment and further displays, on the display apparatus 910, information indicating processing executed between an information processing apparatus identified by a processing apparatus ID and a link target identified by a link target ID in accordance with a display mode by which the information can be identified. The link target represents an information processing apparatus or a device.

Figure 28:
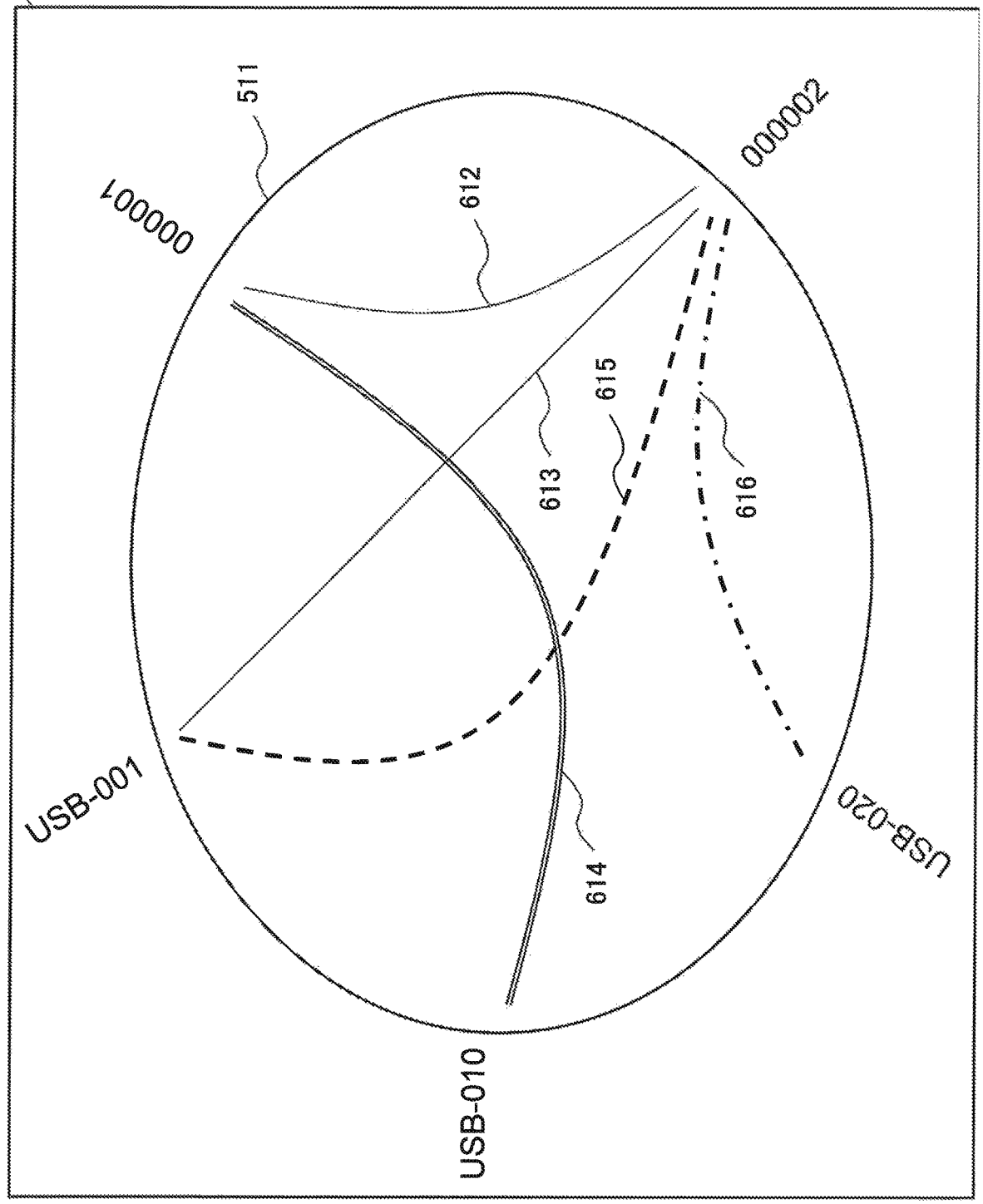
FIG. 28 is a diagram illustrating an example of display information displayed on a display apparatus by the display control apparatus according to the sixth example embodiment.

A display mode to which the display control apparatus 601 according to the sixth example embodiment conform when performing display on the display apparatus 910 will be described in detail with reference to FIG. 28. FIG. 28 is a diagram illustrating an example of display information 610 displayed on the display apparatus 910 by the display control apparatus 601 according to the sixth example embodiment.

For example, the display control apparatus 601 displays, on the display apparatus 910, a mode where processing apparatus ID and a link target ID (a processing apparatus ID or a device ID) are connected to each other, in accordance with a mode varying displays depending on a "link state" stored in inspection information as exemplified in FIG. 19. For example, the display control apparatus 601 displays processing in a case of a "link state" being "new" on the display apparatus 910, in accordance with a mode where a processing apparatus ID and a link target ID are connected to each other by a solid line. On the other hand, for example, the display control apparatus 601 displays processing in a case of a "link state" being "registered" on the display apparatus 910, in accordance with a mode where a processing apparatus ID and a link target ID are connected to each other by a dotted line.

For example, the display control apparatus 601 displays, on the display apparatus 910, a mode where a processing apparatus ID and a link target ID are connected to each other, in accordance with a mode varying displays depending on a "content state" stored in the inspection information as exemplified in FIG. 19. For example, the display control apparatus 601 displays processing in a case of a "content state" being "new" on the display apparatus 910, in accordance with a mode where a processing apparatus ID and a link target ID are connected to each other by a solid line. On the other hand, for example, the display control apparatus 601 displays processing in a case of a "content state" being "registered" on the display apparatus 910, in accordance with a mode where a processing apparatus ID and a link target ID are connected to each other by a dotted line.

Alternatively, for example, the display control apparatus 601 displays, on the display apparatus 910, a mode where a processing apparatus ID and a link target ID are connected to each other, in accordance with a mode varying displays depending on a "link state" and a "content state" stored in the inspection information as exemplified in FIG. 19. In this case, for example, the display control apparatus 601 displays processing executed between an information processing apparatus identified by a processing apparatus ID and a link target identified by a link target ID, in accordance with a mode based on categories indicated in Cases 1 to 4 described below:

Case 1: when the "link state" is "registered" and the "content state" is "registered," the display apparatus 910 performs display by use of a solid line (e.g. solid lines 612 and 613);

Case 2: when the "link state" is "new" and the "content state" is "registered," the display apparatus 910 performs display by use of a dotted line (e.g. a dotted line 615);

Case 3: when the "link state" is "registered" and the "content state" is "new," the display apparatus 910 performs display by use of a dot-and-dash line (e.g. a dot-and-dash line 616); and Case 4: when the "link state" is "new" and the "content state" is "new," the display apparatus 910 performs display by use of a double line (e.g. a double line 614).

While the display control apparatus 601 performs display on the display apparatus 910, in accordance with a display mode of distinguishing between pieces of information about processing by use of a plurality of line types (e.g. a dotted line and a solid line), in the above-described example, the display may not necessarily be performed in accordance with the display mode using line types. For example, the display mode may be a display mode that can be understand by a user, such as a plurality of kinds of line thicknesses and a plurality of colors. For example, the display control apparatus 601 may display information indicating processing on the display apparatus 910 by use of a blue line in Case 1, a green line in Case 2, a yellow line in Case 3, and a red line in Case 4. For example, the display control apparatus 601 may perform display in accordance with a display mode of assigning hues ranging from a cold color to a warm color (or hues ranging from a warm color to a cold color) to Cases 1 to 4 in this order. When hues ranging from a cold color to a warm color are assigned, as a warning level becomes higher (i.e. is closer to Case 4), the hue is closer to red, and therefore the display control apparatus 601 according to the present example embodiment enables a user to easily understand an information processing apparatus (or a device) executing processing with a high warning level.

Next, an advantageous effect of the display control apparatus 601 according to the sixth example embodiment will be described.

The display control apparatus 601 according to the present example embodiment is able to generate display information 610 for specifying an event occurring in the information processing system 901 easily. The reason is similar to the reason described in the fifth example embodiment.

Furthermore, the display control apparatus 601 according to the present example embodiment enables a user to understand a type of information indicating a communication executed between a plurality of information processing apparatuses or a type of information indicating processing executed between an information processing apparatus and a device. The reason is that the display control apparatus 601 displays information about processing (or a communication) in accordance with a display mode based on determination information determined with respect to the executed processing (or communication).

Seventh Example Embodiment

Next, a seventh example embodiment of the present invention based on the above-described fifth example embodiment will be described.

In the following description, a part characteristic of the present example embodiment is mainly described, and a same reference numeral is given to a similar configuration described in the above-described fifth example embodiment, thus omitting redundant description thereof.

Figure 29:
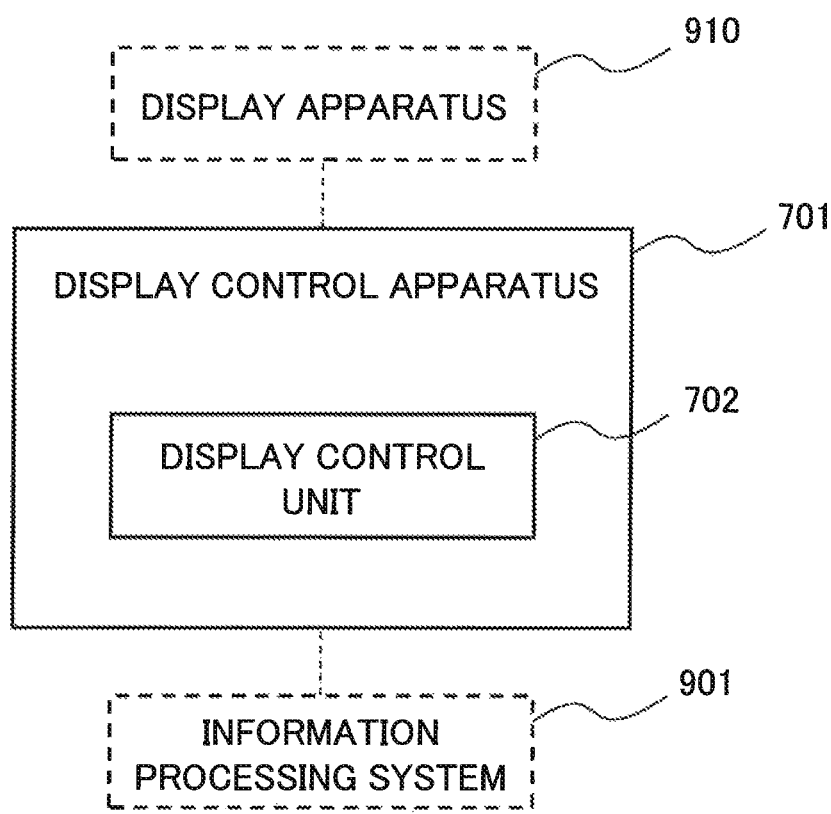
FIG. 29 is a block diagram illustrating a configuration of a display control apparatus according to a seventh example embodiment of the present invention.

A configuration of a display control apparatus 701 according to the seventh example embodiment and processing in the display control apparatus 701 will be described with reference to FIG. 29. FIG. 29 is a block diagram illustrating a configuration of the display control apparatus 701 according to the seventh example embodiment of the present invention.

The display control apparatus 701 according to the seventh example embodiment includes a display control unit (display controller) 702. The display control apparatus 701 can display generated display information (display information 710 [to be described later with reference to FIG. 30] or display information 720 [to be described later with reference to FIG. 31]) on a display apparatus 910.

The display control apparatus 701 inputs inspection information as exemplified in FIG. 19. In the inspection information illustrated in FIG. 19, a link target ID is a processing apparatus ID or a device ID. However, inspection information input by the display control apparatus 701 may not necessarily include a "link state" and a "content state."

The display control unit 702 displays, on the display apparatus 910, information similarly to the display control apparatus 501 according to the fifth example embodiment and further displays a symbol representing an information processing apparatus and a symbol representing a device. Specifically, the display control unit 702 displays, on the display apparatus 910, information similarly to the display control apparatus 501 according to the fifth example embodiment and also displays a symbol representing a type of a link target identified by a link target ID. For example, the display control unit 702 displays a symbol (e.g. symbols 712 and 713 in FIG. 30) near a processing apparatus ID of an information processing apparatus in such a way that the symbol overlaps a surrounding of a first area 511. Similarly, the display control unit 702 displays a symbol (e.g. symbols 714 to 716 in FIG. 30) near a device ID of a device in such a way that the symbol overlaps the surrounding of the first area 511. In other words, a symbol is displayed on a boundary line constituting the first area 511 or in accordance with a display mode of at least being linked to the boundary line (hereinafter simply abbreviated to "on the boundary line" for convenience of description).

The display control unit 702 may further display the surrounding of the first area 511.

Figure 30:
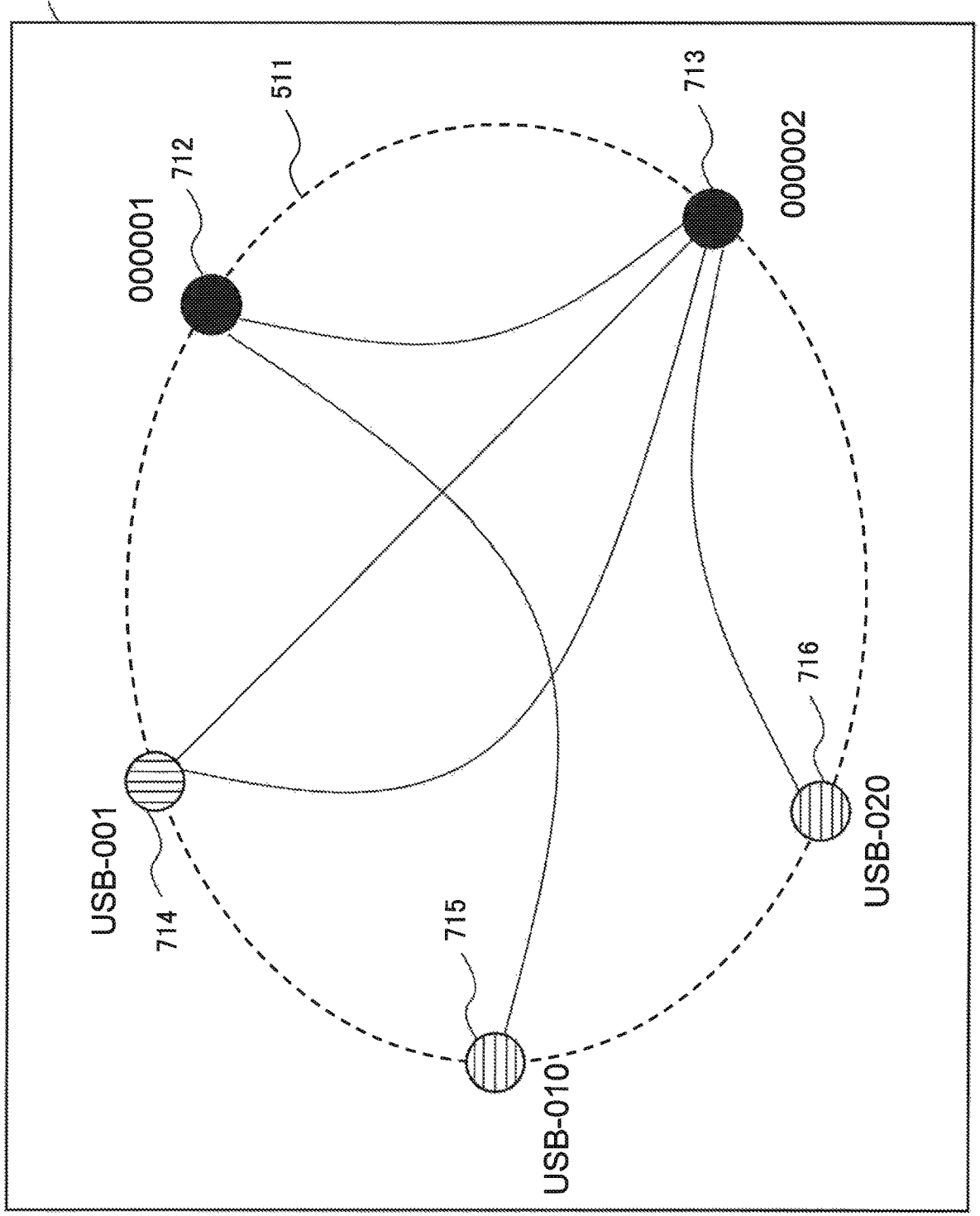
FIG. 30 is a diagram illustrating an example of display information displayed on a display apparatus by the display control apparatus 701 according to the seventh example embodiment.

A display mode to which the display control apparatus 701 according to the seventh example embodiment conforms when performing display on the display apparatus 910 will be described in detail with reference to FIG. 30. FIG. 30 is a diagram illustrating an example of display information 710 displayed on the display apparatus 910 by the display control apparatus 701 according to the seventh example embodiment.

The display control apparatus 701 displays a black circle (symbols 712 and 713) near a processing apparatus ID of an information processing apparatus, as a symbol representing the information processing apparatus. The display control apparatus 701 displays a striped circle (symbols 714 to 716) near a device ID of a device, as a symbol representing the device.

When displaying a symbol representing a device, the display control apparatus 701 may further perform display by use of a symbol for specifying whether or not the device is an authorized device. For example, in the display information 710 exemplified in FIG. 30, the display control apparatus 701 displays a horizontally-striped circle (symbols 715 and 716) as a symbol representing an authorized device and displays a vertically-striped circle (symbol 714) as a symbol representing an unauthorized device. In this case, a user looks at a symbol type and, thereby, can understand whether a displayed symbol represents an information processing apparatus, an authorized device, or an unauthorized device.

While a symbol is specified by a pattern assigned to a circle in the above-described example, symbols may be expressed as, for example, circles with different hues. Additionally, a symbol may be expressed by use of a code such as a letter and a number, or a shape. The method of expressing a symbol type is not limited to the above-described examples.

Figure 31:
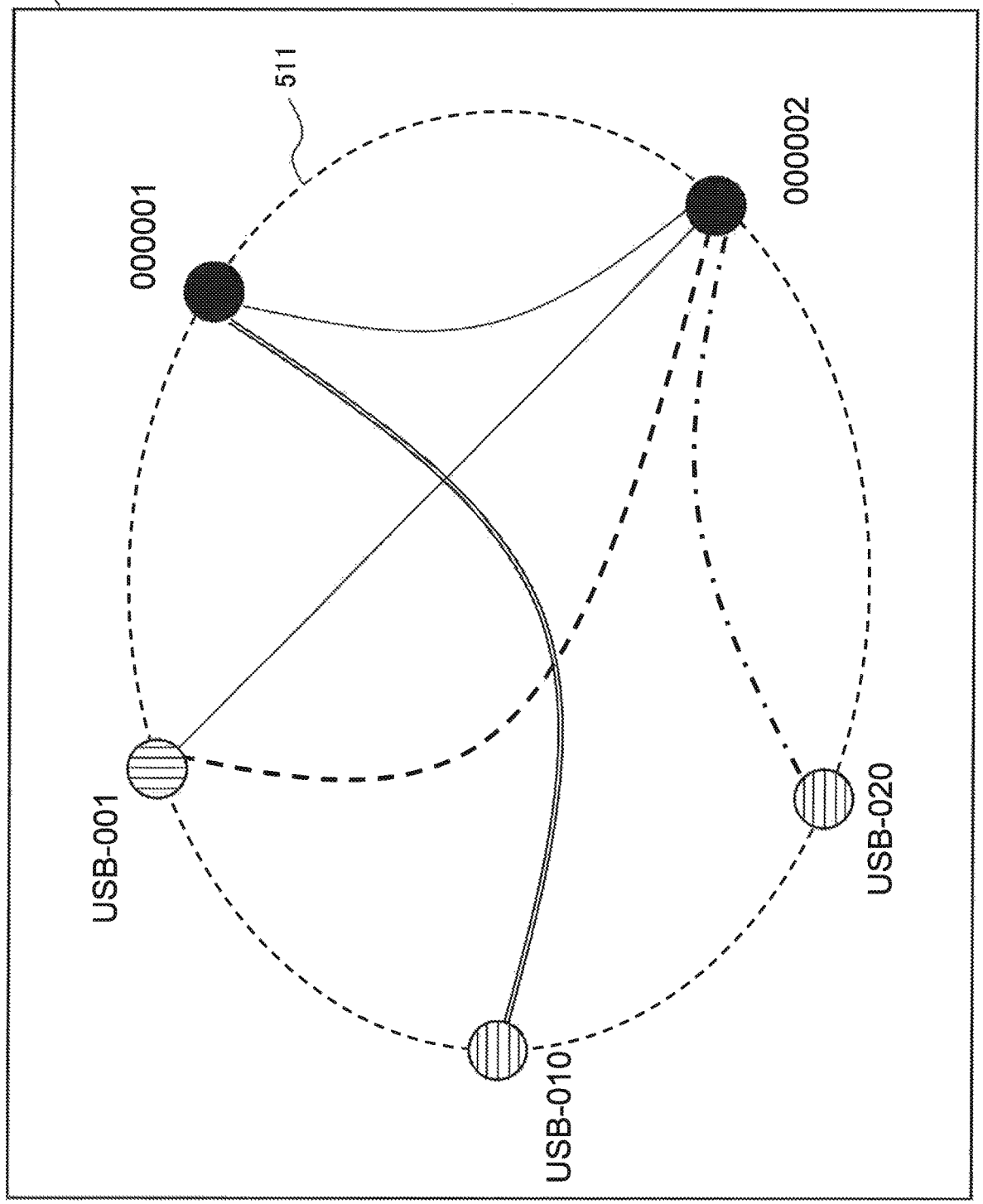
FIG. 31 is a diagram illustrating an example of display information displayed on a display apparatus by the display control apparatus 701 according to the seventh example embodiment.

The display control apparatus 701 may generate display information 720 (FIG. 31) including information indicating processing (or a communication), by performing processing similar to the processing in the display control apparatus 601 according to the sixth example embodiment. FIG. 31 is a diagram illustrating an example of display information 720 displayed on the display apparatus 910 by the display control apparatus 701 according to the seventh example embodiment. The display control apparatus 701 may display generated display information 720 on the display apparatus 910.

Next an advantageous effect of the display control apparatus 701 according to the seventh example embodiment will be described.

The display control apparatus 701 according to the present example embodiment is able to generate display information for specifying an event occurring in the information processing system 901 easily. The reason is similar to the reason described in the fifth example embodiment.

Furthermore, the display control apparatus 701 according to the present example embodiment enables a user to understand whether a link target ID represents an information processing apparatus or a device by recognizing a displayed symbol. The reason is that the display control apparatus 701 displays different symbols depending on a type associated with a link target ID.

Further, when the display control apparatus 701 displays different symbols on the display apparatus 910 depending on whether or not a device is an authorized device, a user looks at a displayed symbol and can, thereby, understand whether a link target ID represents an unauthorized device or an authorized device.

Further, the display control apparatus 701 may execute the processing performed by the display apparatus 910 according to the above-described first to fourth example embodiments of the present invention and further execute the processing described in the present example embodiment.

Eighth Example Embodiment

Next, an eighth example embodiment of the present invention based on the above-described seventh example embodiment will be described.

In the following description, a part characteristic of the present example embodiment is mainly described, and a same reference numeral is given to a similar configuration described in the above-described seventh example embodiment, thus omitting redundant description thereof.

Figure 32:
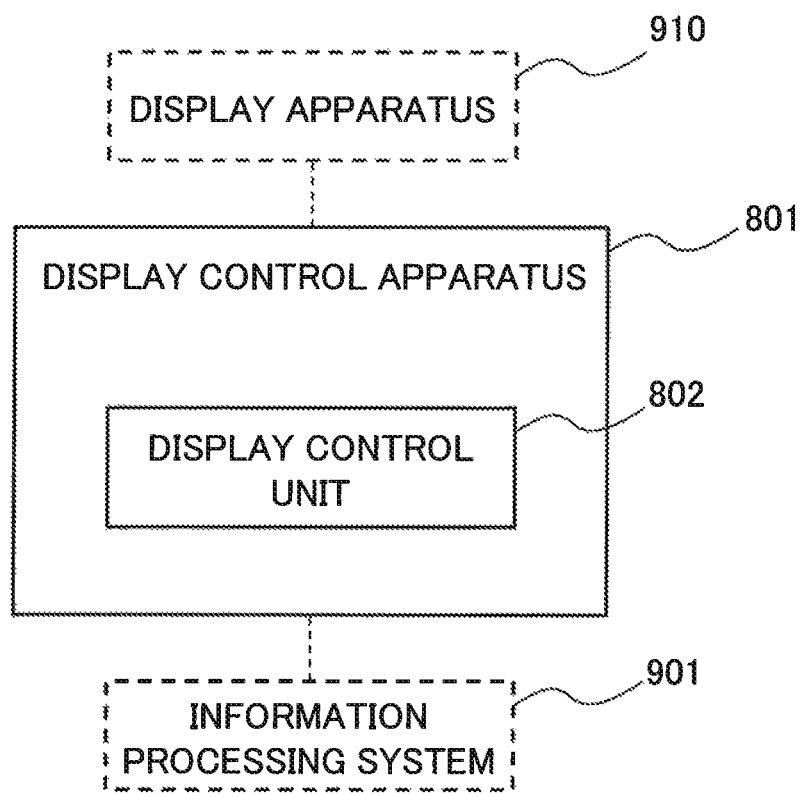
FIG. 32 is a block diagram illustrating a configuration of a display control apparatus according to an eighth example embodiment of the present invention.

A configuration of a display control apparatus 801 according to the eighth example embodiment and processing in the display control apparatus 801 will be described with reference to FIG. 32. FIG. 32 is a block diagram illustrating a configuration of the display control apparatus 801 according to the eighth example embodiment of the present invention.

The display control apparatus 801 according to the eighth example embodiment includes a display control unit (display controller) 802. The display control apparatus 801 can display generated display information 810 (to be described later with reference to FIG. 33) on a display apparatus 910.

The display control apparatus 801 inputs inspection information as exemplified in FIG. 19. In the inspection information illustrated in FIG. 19, a link target ID is a processing apparatus ID or a device ID. However, inspection information input by the display control apparatus 801 may not necessarily include a "link state" and a "content state."

Figure 33:
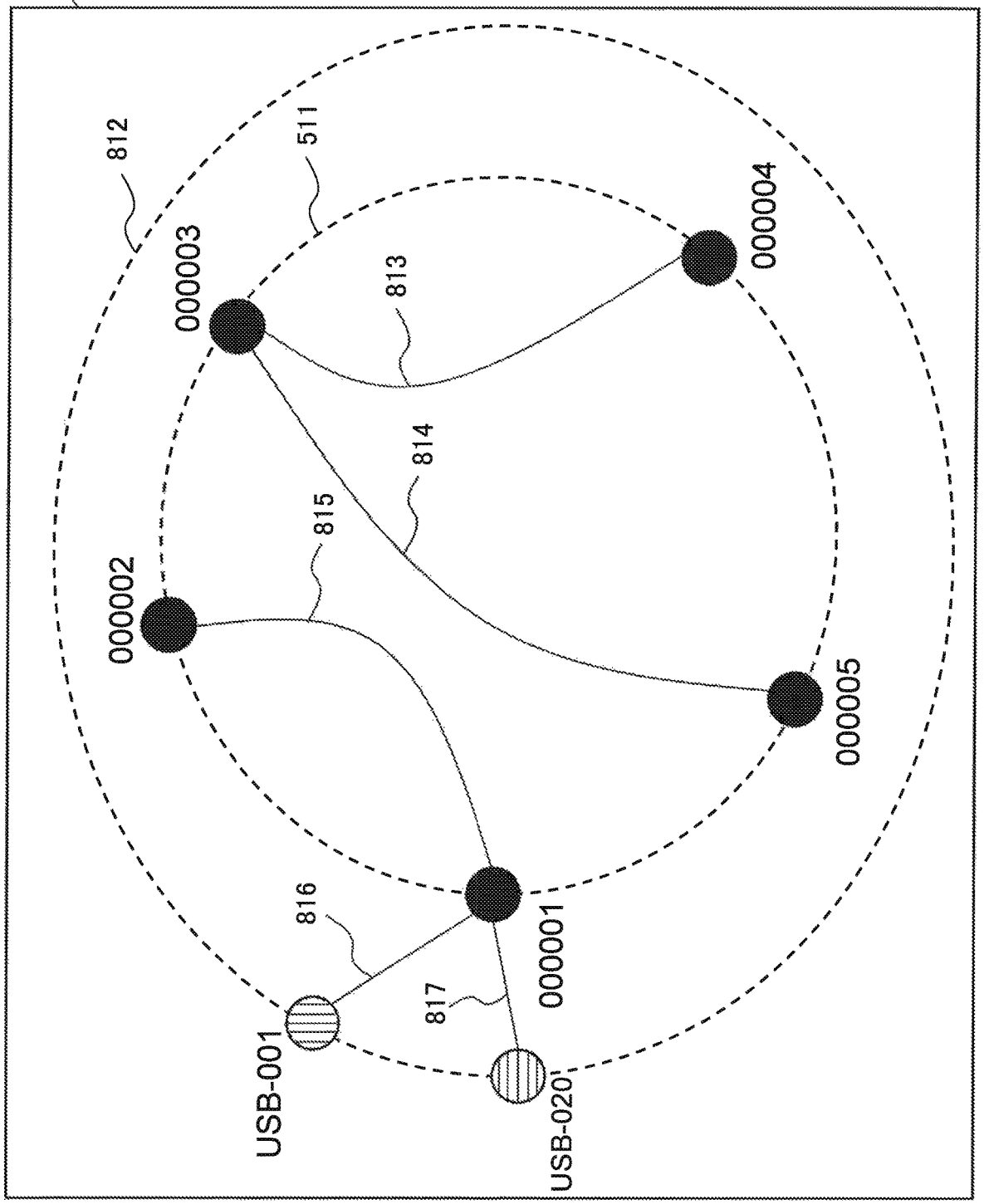
FIG. 33 is a diagram illustrating an example of display information displayed on a display apparatus by the display control apparatus according to the eighth example embodiment.

As exemplified in FIG. 33, when a type associated with a link target ID is "information processing apparatus" (i.e. the link target is an information processing apparatus), the display control unit 802 displays the link target ID, in accordance with a mode of arranging the link target ID around (in a vicinity of, in a neighborhood of) a first area 511. Additionally, when a type associated with a link target ID is "device" (i.e. the link target is a device), the display control unit 802 displays the link target ID, in accordance with a mode of arranging the link target ID around (in a vicinity of, in a neighborhood of) a second area 812. The second area 812 includes the first area 511. FIG. 33 is a diagram illustrating an example of display information 810 displayed on the display apparatus 910 by the display control apparatus 801 according to the eighth example embodiment.

The display control unit 802 displays, inside the first area 511, information indicating a communication among a plurality of information processing apparatuses, in accordance with a display mode of connecting (joining, linking) processing apparatus IDs representing the respective information processing apparatuses (e.g. a mode of being connected by use of lines 813 to 815). Additionally, the display control unit 802 displays information indicating processing executed between an information processing apparatus and a device linked to the information processing apparatus, in an area inside the second area 812 and outside the first area 511, in accordance with a display mode of connecting (joining, linking) a processing apparatus ID of the information processing apparatus to a device ID of the device (e.g. a mode of being connected by use of a line 816 or 817).

For convenience of description, it is assumed that IDs "000001," "000002," "000003," "000004," and "000005" represent processing apparatus IDs. It is assumed that IDs "USB-001" and "USB-002" represent device IDs.

The display control unit 802 displays the IDs "000001," "000002," "000003," "000004," and "000005" in accordance with a mode of arranging the processing apparatus IDs around the first area 511. The display control unit 802 displays the IDs "USB-001" and "USB-002" in accordance with a mode of arranging the processing apparatus IDs around the second area 812.

Next, the display control unit 802 displays, inside the first area 511, information indicating a communication among a plurality of information processing apparatuses, in accordance with a display mode of connecting (joining, linking) the link target ID to a processing apparatus ID associated with the link target ID (e.g. a mode of being connected by use of a line). For example, lines 813, 814, and 815 are lines displayed by the processing. In other words, information indicating a communication among a plurality of information processing apparatuses is displayed inside the first area 511.

When an ID is a device ID, the display control unit 802 displays information indicating executed processing in an area inside the second area 812 and outside the first area 511, in accordance with a display mode of connecting (joining, linking) the link target ID to a processing apparatus ID associated with the link target ID (e.g. a mode of being connected by a line). For example, lines 816 and 817 are lines displayed by the processing. In other words, information indicating processing executed between an information processing apparatus and a device is displayed in the area inside the second area 812 and outside the first area 511.

While symbols are displayed in the display information exemplified in FIG. 33 for convenience of description, the display control apparatus 801 may not necessarily display a symbol. Alternatively, by executing processing similar to that in the display control apparatus 701 according to the seventh example embodiment, the display control apparatus 801 may display a symbol indicating a type (or whether authorized or not) of a device (or an information processing apparatus).

Next, an advantageous effect of the display control apparatus 801 according to the eighth example embodiment will be described.

The display control apparatus 801 according to the present example embodiment can generate display information for specifying an event occurring in the information processing system 901 easily. The reason is similar to the reason described in the seventh example embodiment.

Furthermore, the display control apparatus 801 according to the present example embodiment enables a user to easily understand information indicating a communication among a plurality of information processing apparatuses and information indicating processing executed between an information processing apparatus and a device. The reason is that the display control apparatus 801 displays the two types of information in different areas.

(Hardware Configuration Example)

A configuration example of hardware resources that realize a display control apparatus according to each example embodiment of the present invention will be described. However, the display control apparatus may be realized using physically or functionally at least two calculation processing apparatuses. Further, the display control apparatus may be realized as a dedicated apparatus.

Figure 34:
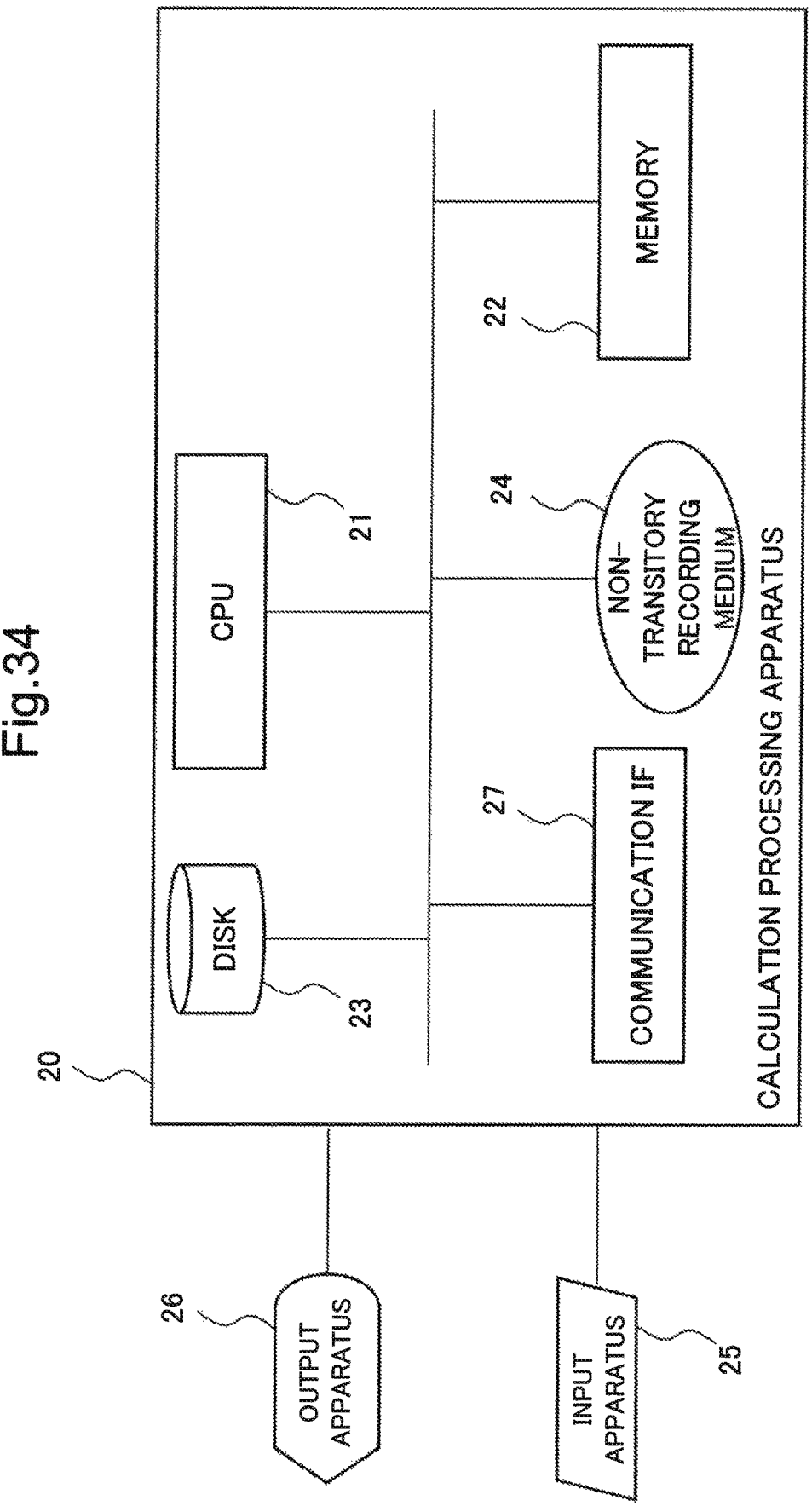
FIG. 34 is a block diagram schematically illustrating a hardware configuration of a calculation processing apparatus capable of realizing a display control apparatus according to each example embodiments of the present invention.

FIG. 34 is a block diagram schematically illustrating a hardware configuration of a calculation processing apparatus capable of realizing the display control apparatus according to the first to eighth example embodiments of the present invention. A calculation processing apparatus 20 includes a central processing unit (CPU) 21, a memory 22, a disk 23, a non-transitory recording medium 24, and a communication interface (hereinafter, expressed as. "communication I/F") 27. The calculation processing apparatus 20 may connect an input apparatus 25 and an output apparatus 26. The calculation processing apparatus 20 can execute transmission/reception of information to/from another calculation processing apparatus and a communication apparatus via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disk 23 when executing the program and executes arithmetic processing. The CPU 21 reads data necessary for program execution from the memory 22. When display is needed, the CPU 21 displays an output result on the output apparatus 26. When a program is input from the outside, the CPU 21 reads the program from the input apparatus 25. The CPU 21 interprets and executes a display control program (FIG. 3, FIG. 8, FIG. 9, FIG. 13, or FIG. 18) present on the memory 22 corresponding to a function (processing) indicated by each unit illustrated in FIG. 1, FIG. 7, FIG. 12, FIG. 17, FIG. 25, FIG. 27, FIG. 29, or FIG. 32 described above. The CPU 21 sequentially executes the processing described in each example embodiment of the present invention.

In other words, in such a case, it is conceivable that the present invention can also be made using the display control program. Further, it is conceivable that the present invention can also be made using a computer-readable, non-transitory recording medium storing the display control program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2015-248443, filed on Dec. 21, 2015, the disclosure of which is incorporated herein in its entirety.

REFERENCE SIGNS LIST

101 display control apparatus
102 display control unit
901 information processing system
910 display apparatus
902 information processing apparatus
903 information processing apparatus
904 observation unit
905 observation unit
906 agent
907 agent
201 display control apparatus
202 display control unit
203 link information storage unit
301 display control apparatus
302 display control unit
303 type determination unit
304 device authorizing unit
305 authorized device information storage unit
310 inspection information storage unit
401 display control apparatus
402 display control unit
403 content information determination unit
404 link target determination unit
501 display control apparatus
502 display control unit
510 display information
511 first area
512 line
513 line
514 line
515 line
516 line
601 display control apparatus
602 display control unit
610 display information 612 solid line
613 solid line
614 double line
615 dotted line
616 dot-and-dash line
701 display control apparatus
702 display control unit
710 display information
712 symbol
713 symbol
714 symbol
715 symbol
716 symbol
720 display information
801 display control apparatus
802 display control unit
810 display information
812 second area
813 line
814 line
815 line
816 line
817 line
20 calculation processing apparatus
21 CPU
22 memory
23 disk
24 non-transitory recording medium
25 input apparatus
26 output apparatus
27 communication IF

What is claimed is:

1. A display control apparatus comprising:
a memory storing instructions; and
a processor connected to the memory and configured to execute the instructions to:
display a device and a first information processing apparatus on a display apparatus in accordance with a mode of associating the device with the first information processing apparatus;
display a second information processing apparatus and a third information processing apparatus in accordance with a mode of associating the second information processing apparatus with the third information processing apparatus, based on device information indicating the device detected in the first information processing apparatus in an information processing system and communication information indicating a communication between the second information processing apparatus in the information processing system and the third information processing apparatus in the information processing system;
determine whether or not the device is an authorized device to be authorized based on authorized device information indicating a device being authorized; and
display the authorized device and the device not being the authorized device in accordance with different modes.

2. The display control apparatus according to claim 1, wherein
the device information is information where a first processing apparatus identifier of the first information processing apparatus and a device identifier of the device are associated with each other,
the communication information is information where a second processing apparatus identifier of the second information processing apparatus and a third processing apparatus identifier of the third information processing apparatus are associated with each other, and
the processor is configured to execute the instructions to display, on the display apparatus, information where the first processing apparatus identifier and the device identifier are associated with each other and display, on the display apparatus, information where the second processing apparatus identifier and the third processing apparatus identifier are associated with each other.

3. The display control apparatus according to claim 1, wherein
the device information indicates the device detected in the first information processing apparatus at a first timing,
the communication information indicates the communication executed between the second information processing apparatus and the third information processing apparatus at a second timing, and
the processor is configured to execute the instructions to display, on the display apparatus, the device and the first information processing apparatus in accordance with a mode of associating the device with the first information processing apparatus when the first timing is within a predetermined period and display, on the display apparatus, the second information processing apparatus and the third information processing apparatus in accordance with a mode of associating the second information processing apparatus with the third information processing apparatus when the second timing is within the predetermined period.

4. The display control apparatus according to claim 2, wherein
the device information is information where the first processing apparatus identifier of the first information processing apparatus, the device identifier of the device, and a first timing when the first information processing apparatus detects the device are associated with one another,
the communication information is information where the second processing apparatus identifier of the second information processing apparatus, the third processing apparatus identifier of the third information processing apparatus, and a second timing when the communication is executed are associated with one another, and
the processor is configured to execute the instructions to display, on the display apparatus, the first processing apparatus identifier and the device identifier in accordance with a mode of associating the first processing apparatus identifier with the device identifier when the first timing is within a predetermined period and display, on the display apparatus, the second processing apparatus identifier and the third processing apparatus identifier in accordance with a mode of associating the second processing apparatus identifier with the third processing apparatus identifier when the second timing is within the predetermined period.

5. The display control apparatus according to claim 2 comprising:
an authorized device information storage configured to store authorized device information including the device identifier of an authorized device being a device being authorized; wherein
the processor is configured to execute the instructions to determine whether or not the device identifier is included in the authorized device information stored in the authorized device information storage, thereby, determine whether or not the device identifier is the authorized device, and display the device being authorized and the device not being the device being authorized in accordance with different modes when displaying the device on the display apparatus.

6. The display control apparatus according to claim 3, wherein the processor is configured to execute the instructions to determine whether or not a link target is included in the device information indicating the device detected at the first timing at or before a third timing, or the communication information indicating the communication executed at the second timing at or before the third timing when receiving information indicating the link target linked in a fourth information processing apparatus in the information processing system at the third timing from the fourth information processing apparatus, and display the link target in accordance with different modes depending on the determined result when displaying the link target on the display apparatus.

7. The display control apparatus according to claim 3, wherein the processor is configured to execute the instructions to determine whether or not content information is included in the device information indicating the device detected at the first timing at or before a third timing, or the communication information indicating the communication executed at the second timing at or before the third timing when receiving the content information indicating processing executed between a link target linked in a fourth information processing apparatus in the information processing system at the third timing and the fourth information processing apparatus from the fourth information processing apparatus, the device information includes content information indicating processing executed between the first information processing apparatus and the device, the communication information includes content information indicating processing executed between the second information processing apparatus and the third information processing apparatus, and the processor is configured to execute the instructions to display the link target in accordance with different modes depending on the determined result when displaying the link target on the display apparatus.

8. A display control method comprising:

displaying a device and a first information processing apparatus on a display apparatus in accordance with a mode of associating the device with the first information processing apparatus;

displaying a second information processing apparatus and a third information processing apparatus in accordance with a mode of associating the second information processing apparatus with the third information processing apparatus, based on device information indicating the device detected in the first information processing apparatus in an information processing system and communication information indicating a communication between the second information processing apparatus in the information processing system and the third information processing apparatus in the information processing system;

determining whether or not the device is an authorized device to be authorized based on authorized device information indicating a device being authorized; and displaying the authorized device and the device not being the authorized device in accordance with different modes.

9. A non-transitory recording medium storing a display control program recorded therein, the program making a computer achieve functions to:

display a device and a first information processing apparatus on a display apparatus in accordance with a mode of associating the device with the first information processing apparatus;

display a second information processing apparatus and a third information processing apparatus in accordance with a mode of associating the second information processing apparatus with the third information processing apparatus, based on device information indicating the device detected in the first information processing apparatus in an information processing system and communication information indicating a communication between the second information processing apparatus in the information processing system and the third information processing apparatus in the information processing system;

determine whether or not the device is an authorized device to be authorized based on authorized device information indicating a device being authorized; and display the authorized device and the device not being the authorized device in accordance with different modes.

* * * * *